United States Patent
Tang et al.

(10) Patent No.: US 11,456,903 B2
(45) Date of Patent: Sep. 27, 2022

(54) INFORMATION TRANSMISSION METHOD, NETWORK DEVICE AND TERMINAL DEVICE

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 139 days.

(21) Appl. No.: 16/471,440

(22) PCT Filed: Dec. 23, 2016

(86) PCT No.: PCT/CN2016/111837
§ 371 (c)(1),
(2) Date: Jun. 19, 2019

(87) PCT Pub. No.: WO2018/112933
PCT Pub. Date: Jun. 28, 2018

(65) Prior Publication Data
US 2021/0135921 A1    May 6, 2021

(51) Int. Cl.
*H04L 27/26* (2006.01)
*H04W 28/26* (2009.01)
(Continued)

(52) U.S. Cl.
CPC .... *H04L 27/26025* (2021.01); *H04L 27/2607* (2013.01); *H04W 28/26* (2013.01);
(Continued)

(58) Field of Classification Search
CPC .......... H04L 5/0007; H04L 27/26025; H04W 72/0453; H04W 48/12
See application file for complete search history.

(56) References Cited

U.S. PATENT DOCUMENTS

2012/0287885 A1   11/2012   Dai
2016/0352551 A1*  12/2016   Zhang ............... H04L 27/26025
(Continued)

FOREIGN PATENT DOCUMENTS

CN    106231614 A    12/2016
JP    5961282 B2     8/2016
(Continued)

OTHER PUBLICATIONS

English translation of CN OA for CN 20168091852.3 dated Mar. 5, 2020.
(Continued)

*Primary Examiner* — Raj Jain
(74) *Attorney, Agent, or Firm* — Young Basile Hanlon & MacFarlane, P.C.

(57) ABSTRACT

Implementations of the present disclosure provide an information transmission method, a network device and a terminal device. The method includes: a network device sends first configuration information to a terminal device through a first control channel, wherein the first control channel is a control channel in a resource for which a first numerology is used, the first configuration information is used for indicating configuration in a resource for which a second numerology is used, and the first numerology is different from the second numerology.

24 Claims, 19 Drawing Sheets

(51) Int. Cl.
    *H04W 72/02*   (2009.01)
    *H04W 72/04*   (2009.01)
    *H04L 5/00*    (2006.01)

(52) U.S. Cl.
    CPC ......... *H04W 72/02* (2013.01); *H04W 72/042* (2013.01); *H04W 72/0446* (2013.01); *H04W 72/0453* (2013.01); *H04L 5/0007* (2013.01)

(56) References Cited

U.S. PATENT DOCUMENTS

| | | | |
|---|---|---|---|
| 2017/0181149 A1* | 6/2017 | Ang | H04L 5/003 |
| 2018/0124727 A1* | 5/2018 | Baldemair | H04I 5/005 |
| 2019/0149283 A1* | 5/2019 | Tang | H04B 7/0413 375/267 |
| 2020/0092064 A1* | 3/2020 | Tang | H04W 72/042 |

FOREIGN PATENT DOCUMENTS

| | | |
|---|---|---|
| RU | 2501191 C2 | 12/2013 |
| WO | 2016/130175 A1 | 8/2016 |
| WO | 2016/192644 A1 | 12/2016 |

OTHER PUBLICATIONS

English translation of Chile OA for CH 201901703 dated Mar. 13, 2020.
Extended European search report issued in corresponding European application No. 16924506.5 dated Oct. 7, 2019.
3GPP TSG-RAN WG1 Meeting 85; R1-164985 Nanjing, China, May 23-27, 2016, XP051096781.
3GPP TSG RAN WG1 Meeting #86bis; R1-1609425 Lisbon, Portugal, Oct. 10-14, 2016, XP051149468.
Communication pursuant to Article 94(3) EPC Examination for EP Application 16924506.5 dated Oct. 22, 2020.
Chile Office Action with English Translation for CL Application 2019-001703 dated Sep. 4, 2020.
China Office Action with English Translation for CN Application 201680091852.3 dated Sep. 18, 2020.
Canada Office Action for CA Application 3,047,481 dated Aug. 28, 2020.
Russia Office Action with English Translation for RU Application 2019122318/28(043652) dated Oct. 19, 2020.
Brazil Office Action with English Translation for BR Application BR112019012798-4 dated Sep. 11, 2020.
Singapore First Written Opinion for Singapore Patent Application No. 11201905619U dated Jun. 2, 2020.
English Translation of Russian First Office Action for Russian Patent Application No. 2019122318 dated Jul. 9, 2020.
3GPP TSG-RAN WG1 #87 ; R1-1613023; Reno, NV, USA, Nov. 14-18, 2016; On the transmission DL control information and data using different numerologies; pp. 1-5.
3GPP TSG RAN WG1 Meeting #87; R1-1611656; Reno, USA, Nov. 14-18, 2016; Email discussion [86b-23] on multi-steps DL control channel design; pp. 1-14.
English Translation of Chinese Second Office Action for Chinese Patent Application No. 201680091852.3 dated Jun. 9, 2020.
3GPP TSG RAN WG1 #85 R1-165107 May 23-27, 2016 Nanjing, China.
Indonesia Examination Report with English Translation for ID Application P00201906073 dated Jun. 28, 2021. (6 pages).
Israel Examination Report with English Translation for IL Application 267552 dated Jun. 27, 2021. (6 pages).
Singapore Invitation to Respond to Written Opinion for SG Application 11201905619U dated May 12, 2021. (7 pages).
India Office Action for IN Application 201917024055 dated Feb. 12, 2021. (6 pages).
Japan Office Action with English Translation for JP Application 2019-533057 dated Jan. 29, 2021. (6 pages).
Taiwan Office Action with English Translation for TW Application 106141708 dated Feb. 26, 2021. (15 pages).
Guangdong OPPO Mobile Telecom, Downlink control channel design consideration, 3GPP TSG RAN WG1 Meeting #87, R1-1611704, Nov. 14-18, 2016. (5 pages).
LG Electronics, On DCI design in NR, 3GPP WG1 Meeting #87, R1-1611839, Nov. 14-18, 2016. (4 pages).
Vietnam Office Action with English Translation for VN Application 1201903584 dated Jun. 30, 2022. (4 pages).
Japanese Office Action with English Translation for JP Application 2021132393 dated Jul. 5, 2022. (6 pages).
Mexican Substantive Examination Requirement with English Translation for MX Application 2019007286 dated Jun. 21, 2022. (6 pages).
Inter Digital Communications, Downlink Control Channel Framework for NR, 3GPP TSG-RAN WG1 #87, R1-1612312, Nov. 14-18, 2016. (5 pages).
Inter Digital Communications, Blocking probability of control channel for URLLC, 3GPP TSG RAN WG1 Meeting #87, R1-1612644, Nov. 14-18, 2016. (6 pages).
Canadian Examination Report for CA Application 3047481 dated Aug. 11, 2021. (4 pages).
Australian Examination Report for AU Application 2016433341 dated Aug. 30, 2021. (4 pages).
Taiwan Decision of Rejection with English Translation for TW Application 106141708 dated Jul. 29, 2021. (6 pages).
Australian Examination Report for AU Application 2016433341 dated Feb. 23, 2022. (4 pages).
Israel Office Action with English Translation for IL Application 267552 dated Feb. 17, 2022. (5 pages).
Singapore Notice of Eligibility for Grant for SG Application 11201905619U dated Apr. 7, 2022. (6 pages).
Australian Examination Report for AU Application 2016433341 dated Jun. 15, 2022. (3 pages).
Extended European Search Report for EP Application 22152492.9 dated May 10, 2022. (12 pages).

* cited by examiner

INFORMATION TRANSMISSION METHOD, NETWORK DEVICE AND TERMINAL DEVICE

CROSS-REFERENCE TO RELATED APPLICATION(S)

This application is a 371 application of International Application No. PCT/CN2016/111837, filed on Dec. 23, 2016, the entire disclosure of which is hereby incorporated by reference.

TECHNICAL FIELD

Implementations of the present disclosure relate to the communication field, and more particularly, to an information transmission method, a network device and a terminal device.

BACKGROUND

At present, a Long Term Evolution (LTE) communication system only supports a single numerology, such as, subcarrier spacing of 15 kHz, and the subcarrier spacing of 15 kHz is used for both control channels and data channels. In addition, the control channels are of a single structure, frequency-domain resources of the control channels are fixed, and occupy the whole broadband, so there is no problem of design for multiple numerologies for the control channels.

A variety of numerologies are introduced into the 5th generation mobile communication technology (5G) system. Downlink control channels in resources of each numerology include a common control channel and a user equipment (UE)-specific control channel. In the existing art, information of the UE-specific control channel in a resource corresponding to a numerology is indicated by a common control channel in the resource. A problem in this method is that when there are multiple numerologies, a network device needs to transmit the common control channel in the resource of each numerology, resulting in large overhead of common control channels and waste of system resources. Besides, a terminal also needs to search for the common control channel in the resource of each numerology, which increases complexity of the terminal, and increases the power consumption of the terminal device. Therefore, it is urgent to put forward a method to solve the problem.

SUMMARY

Implementations of the present disclosure provide an information transmission method, a network device and a terminal device.

In a first aspect, an information transmission method is provided. The method includes: a network device sends first configuration information to a terminal device through a first control channel. The first control channel is a control channel in a resource for which a first numerology is used, the first configuration information is used for indicating configuration in a resource for which a second numerology is used, and the first numerology is different from the second numerology.

In an implementation of the present disclosure, the network device may indicate configuration information in a resource of other numerology (such as the second numerology) by a channel (such as the first control channel) in the resource for which the first numerology is used, and send relevant configuration information (such as the first configuration information) to the terminal device. In this way, the network device does not need to send a common control channel of each numerology, thereby reducing overhead of the common control channels. Correspondingly, the terminal device may receive the first configuration information sent by the network device through the first control channel in the resource of the first numerology to obtain the configuration information in resources of multiple numerologies.

In an implementation of the present disclosure, a resource of the first numerology is different from a resource the second numerology.

In an implementation of the present disclosure, the first configuration information may indicate various configuration information in the resource for which the second numerology is used, for example, configuration information, such as, slot structure information, a reserved resource, resource pool information, etc. It should be understood that the first configuration information may include various configuration information in the resource of the second numerology, and the present disclosure is not limited thereto.

Optionally, the numerology of the first control channel may be the same as the first numerology or different from the first numerology. Similarly, the numerology of the second control channel may be the same as the second numerology or different from the second numerology.

In some possible implementations, the first control channel may be a common control channel, and the second channel may be a UE-specific control channel (i.e., a specific control channel of the terminal device). That is, the network device may indicate a relevant configuration of the UE-specific control channel in the time-frequency resource of the second numerology through the common control channel in the time-frequency resource of the first numerology.

In some possible implementations, the first configuration information may include at least one of: serial number information of a time-domain scheduling element where the second control channel is located, information of a resource used by the second control channel, and information of a numerology used by the second control channel.

In some possible implementations, different numerologies may be used for the first control channel and the second control channel.

Optionally, the numerology used by the second control channel may be indicated in the information of the resource used by the second control channel, or may be indicated by the network device through other implicit forms.

In some possible implementations, optionally the first configuration information may include at least one of: structure information of a time-domain scheduling element in a resource of the second numerology, information of a reserved resource in the resource of the second numerology, and information of a resource pool in the resource of the second numerology.

It should be understood that the information included in the first configuration information may be sent through same configuration information or may be sent in different configuration information, and the present disclosure is not limited thereto.

For example, optionally, the first configuration information may include structure information of a time-domain scheduling element in a time-frequency resource of the second numerology. The structure of the time-domain scheduling element in the resource of the second numerology may include: information such as an uplink resource portion, a downlink resource portion, or a length of a guard period (GAP).

In some possible implementations, the first control channel may carry indication information. The indication information is used for indicating a serial number of the time-domain scheduling element corresponding to the first configuration information.

In a second aspect, an information transmission method is provided. The method includes: a network device sends first configuration information to a terminal device through a first control channel. The first configuration information is used for indicating a configuration of a second control channel, and a numerology used for the first control channel is different from that used for the second control channel.

In the information transmission method according to the implementations of the present disclosure, the network device sends the first configuration information to the terminal device through the first control channel. The first configuration information is used for indicating the configuration of the second control channel, and a numerology used for the first control channel is different from that used for the second control channel. In such way, configurations of UE-specific control channels of multiple numerologies can be indicated through the common control channel of a numerology, thereby avoiding to send the common control channels of the multiple numerologies, and reducing the overhead of the common control channels.

In an implementation of the present disclosure, a network device may send first configuration information to a terminal device through a first control channel, and the first configuration information is used for indicating various configurations of the second control channel. Here, a numerology used for the first control channel is different from that used for the second control channel. Here, optionally, the first control channel and the second control channel may belong to a same resource. For example, both a resource of the first control channel and a resource of the second control channel may belong to "the resource used for the first numerology", or they may both be in "the resource used for the second numerology", which is not limited.

In some possible implementations, the first control channel is a common control channel, and the second control channel is a specific control channel of the terminal device.

In some possible implementations, the first configuration information includes at least one of: serial number information of a time-domain scheduling element where the second control channel is located, information of a resource used for the second control channel, and information of a numerology used for the second control channel.

In some possible implementations, the time-domain scheduling element includes a time slot, a mini-slot, or a subframe.

In some possible implementations, the numerology includes at least one of following parameters: a subcarrier spacing, a width of a frequency-domain scheduling element, a length of an orthogonal frequency division multiplexing (OFDM) symbol, a length of a minimum time-domain scheduling element, and a length of a cyclic prefix (CP).

In a third aspect, an information transmission method is provided. The method includes: a network device sends first configuration information to a terminal device through system information in a resource for which a first numerology is used. The first configuration information is used for indicating a configuration in a resource for which a second numerology is used, and the first numerology is different from the second numerology.

In an implementation of the present disclosure, the network device may send first configuration information to the terminal device through system information in a resource for which the first numerology is used. The first configuration information is used for indicating configuration in a resource for which the second numerology is used, and the first numerology is different from the second numerology. In such way, the network device does not need to send a common control channel of each numerology, thus reducing the overhead of the common control channels. Correspondingly, the terminal device can receive the first configuration information sent by the network device through the system information in the resource of the first numerology to obtain configuration information in resources of multiple numerologies, thereby avoiding searching for control channels in the resources of the multiple numerologies, reducing complexity of the terminal device and saving power of the terminal device.

In an implementation of the present disclosure, the system information may be understood as system broadcast information.

In some possible implementations, the first configuration information is configuration information of a control channel in a resource of the second numerology.

In some possible implementations, the first configuration information includes at least one of: serial number information of a time-domain scheduling element where the control channel is located, information of a resource used by the control channel, and information of a numerology used for the control channel.

In some possible implementations, the time-domain scheduling element includes a time slot, a mini-slot, or a subframe.

In some possible implementations, the first configuration information includes at least one of: structure information of a time-domain scheduling element in a resource of the second numerology, information of a reserved resource in the resource of the second numerology, and information of a resource pool in the resource of the second numerology.

It should be understood that information included in the first configuration information may be sent through same configuration information or may be sent in different configuration information, and the present disclosure is not limited thereto.

In some possible implementations, the system information carries indication information for indicating a serial number of a time-domain scheduling element corresponding to the first configuration information.

In some possible implementations, the numerology includes at least one of following parameters:
a subcarrier spacing, a width of a frequency-domain scheduling element, a length of an orthogonal frequency division multiplexing (OFDM) symbol, a length of a minimum time-domain scheduling element, and a length of a cyclic prefix (CP).

In a fourth aspect, an information transmission method is provided. The method includes: a terminal device receives first configuration information sent by a network device through a first control channel. The first control channel is a control channel in a resource for which a first numerology is used, the first configuration information is used for the network device to indicate a configuration in a resource for which a second numerology is used, and the first numerology is different from the second numerology.

In an implementation of the present disclosure, the terminal device receives first configuration information sent by the network device through a first control channel. The first control channel is a control channel in a resource for which a first numerology is used, the first configuration information is used for the network device to indicate configuration in a resource for which the second numerology is used, and the first numerology is different from the second numerology. Therefore, the overhead of common control channels can be reduced, and power of the terminal device can be saved. In other words, the terminal device may receive the first configuration information sent by the network device through the first control channel in the resource of the first numerology to obtain configuration information in resources of multiple numerologies.

In some possible implementations, the first configuration information is configuration information of a control channel in a resource of the second numerology.

In some possible implementations, the first control channel is a common control channel, and the second control channel is a specific control channel of the terminal device.

In some possible implementations, the first configuration information includes at least one of: serial number information of a time-domain scheduling element where the second control channel is located, information of a resource used for the second control channel, and information of a numerology used for the second control channel.

In some possible implementations, the first configuration information includes at least one of: structure information of a minimum time-domain scheduling element in a resource of the second numerology, information of a reserved resource in the resource of the second numerology, and information of a resource pool in the resource of the second numerology.

It should be understood that information included in the first configuration information may be sent through same configuration information or may be sent in different configuration information, and the present disclosure is not limited thereto.

In some possible implementations, the first control channel carries indication information for indicating a serial number of a time-domain scheduling element corresponding to the first configuration information.

In some possible implementations, the time-domain scheduling element includes a time slot, a mini-slot, or a subframe.

In some possible implementations, a numerology used for the first control channel is different from that used for the second control channel.

In some possible implementations, the numerology includes at least one of following parameters: a subcarrier spacing, a width of a minimum frequency-domain scheduling element, a length of an orthogonal frequency division multiplexing (OFDM) symbol, a length of a minimum time-domain scheduling element, and a length of a cyclic prefix (CP).

In a fifth aspect, an information transmission method is provided. The method includes: a terminal device receives first configuration information sent by a network device through a first control channel. The first configuration information is used for indicating a configuration of a second control channel, and a numerology used for the first control channel is different from that used for the second control channel.

In an implementation of the present disclosure, the terminal device receives first configuration information sent by the network device through a first control channel. The first configuration information is used for indicating a configuration of a second control channel, and a numerology used for the first control channel is different from that used for the second control channel. In such way, configurations of UE-specific control channels of multiple numerologies can be indicated through a common control channel of a numerology, thereby avoiding to send common control channels of the multiple numerologies, and reducing the overhead of the common control channels and saving the power of the terminal device.

In some possible implementations, the first control channel is a common control channel, and the second control channel is a specific control channel of the terminal device.

In some possible implementations, the first configuration information includes at least one of: serial number information of a time-domain scheduling element where the second control channel is located, information of a resource used for the second control channel, and information of a numerology used for the second control channel.

In some possible implementations, the time-domain scheduling element includes a time slot, a mini-slot, or a subframe.

In some possible implementations, the numerology includes at least one of following parameters: a subcarrier spacing, a width of a frequency-domain scheduling element, a length of an orthogonal frequency division multiplexing (OFDM) symbol, a length of a minimum time-domain scheduling element, and a length of a cyclic prefix (CP).

In a sixth aspect, an information transmission method is provided. The method includes: a terminal device receives first configuration information sent by a network device through system information in a resource for which a first numerology is used. The first configuration information is used for indicating a configuration in a resource for which a second numerology is used, and the first numerology is different from the second numerology.

In an implementation of the present disclosure, the terminal device receives first configuration information sent by the network device through system information in a resource for which a first numerology is used. The first configuration information is used for indicating a configuration in a resource for which the second numerology is used, and the first numerology is different from the second numerology. The overhead of the common control channels can be reduced, and the power of the terminal device can be saved. In other words, the terminal device may receive the first configuration information sent by the network device through the system information in the resource of the first numerology to obtain configuration information in resources of multiple numerologies, thereby avoiding searching for the control channels in the resources of the multiple numerologies, reducing the complexity of the terminal device and saving the electrical energy of the terminal device.

In some possible implementations, the first configuration information is configuration information of a control channel in a resource of the second numerology.

In some possible implementations, the first configuration information includes at least one of: serial number information of a time-domain scheduling element where the control channel is located, information of a resource used for the control channel, and information of a numerology used for the control channel.

In some possible implementations, the time-domain scheduling element includes a time slot, a mini-slot, or a subframe.

In some possible implementations, the first configuration information includes at least one of: structure information of a time-domain scheduling element in a resource of the second numerology, information of a reserved resource in the resource of the second numerology, and information of a resource pool in the resource of the second numerology.

In some possible implementations, the system information carries indication information for indicating a serial number of the time-domain scheduling element corresponding to the first configuration information.

In some possible implementations, the time-domain scheduling element includes a time slot, a mini-slot, or a subframe.

In some possible implementations, the numerology includes at least one of following parameters:

a subcarrier spacing, a width of a frequency-domain scheduling element, a length of an orthogonal frequency division multiplexing (OFDM) symbol, a length of a minimum time-domain scheduling element, and a length of a cyclic prefix (CP).

In a seventh aspect, a network device is provided. The network device is used for performing the method in the above first aspect or any possible implementation of the first aspect. Specifically, the device includes units for performing the method in the above first aspect or any possible implementation of the first aspect.

In an eighth aspect, a network device is provided. The network device is used for performing the method in the above second aspect or any possible implementation of the second aspect. Specifically, the device includes units for performing the method in the above second aspect or any possible implementation of the second aspect.

In a ninth aspect, a network device is provided. The network device is used for performing the method in the above third aspect or any possible implementation of the third aspect. Specifically, the device includes units for performing the method in the above third aspect or any possible implementation of the third aspect.

In a tenth aspect, a terminal device is provided. The terminal device is used for performing the method in the above fourth aspect or any possible implementation of the fourth aspect. Specifically, the device includes units for performing the method in the above fourth aspect or any possible implementation of the fourth aspect.

In an eleventh aspect, a terminal device is provided. The terminal device is used for performing the method in the above fifth aspect or any possible implementation of the fifth aspect. Specifically, the device includes units for performing the method in the above fifth aspect or any possible implementation of the fifth aspect described above.

In a twelfth aspect, a terminal device is provided. The terminal device is used for performing the method in the above sixth aspect or any possible implementation of the sixth aspect. Specifically, the device includes units for performing the method in the above sixth aspect or any possible implementation of the sixth aspect.

In a thirteenth aspect, a network device is provided. The network device includes a processor, a storage, and a communication interface. The processor is connected with the storage and the communication interface. The storage is used for storing instructions, the processor is used for executing the instructions, and the communication interface is used for communicating with other network elements under the control of the processor. When the processor executes the instructions stored in the storage, the execution causes the processor to perform the method in the first aspect or any possible implementation of the first aspect.

In a fourteenth aspect, a network device is provided. The network device includes a processor, a storage, and a communication interface. The processor is connected with the storage and the communication interface. The storage is used for storing instructions, the processor is used for executing the instructions, and the communication interface is used for communicating with other network elements under the control of the processor. When the processor executes the instructions stored in the storage, the execution causes the processor to perform the method in the second aspect or any possible implementation of the second aspect.

In a fifteenth aspect, a network device is provided. The network device includes a processor, a storage, and a communication interface. The processor is connected with the storage and the communication interface. The storage is used for storing instructions, the processor is used for executing the instructions, and the communication interface is used for communicating with other network elements under the control of the processor. When the processor executes the instructions stored in the storage, the execution causes the processor to perform the method in the third aspect or any possible implementation of the third aspect.

In a sixteenth aspect, a terminal device is provided. The terminal device includes a processor, a storage, and a communication interface. The processor is connected with the storage and the communication interface. The storage is used for storing instructions, the processor is used for executing the instructions, and the communication interface is used for communicating with other network elements under the control of the processor. When the processor executes the instructions stored in the storage, the execution causes the processor to perform the method in the fourth aspect or any possible implementation of the fourth aspect.

In a seventeenth aspect, a terminal device is provided. The terminal device includes a processor, a storage, and a communication interface. The processor is connected with the storage and the communication interface. The storage is used for storing instructions, the processor is used for executing the instructions, and the communication interface is used for communicating with other network elements under the control of the processor. When the processor executes the instructions stored in the storage, the execution causes the processor to perform the method in the fifth aspect or any possible implementation of the fifth aspect.

In an eighteenth aspect, a terminal device is provided. The terminal device includes a processor, a storage, and a communication interface. The processor is connected with the storage and the communication interface. The storage is used for storing instructions, the processor is used for executing the instructions, and the communication interface is used for communicating with other network elements under the control of the processor. When the processor executes the instructions stored in the storage, the execution causes the processor to perform the method in the sixth aspect or any possible implementation of the sixth aspect.

In a nineteenth aspect, a computer-readable storage medium is provided. The computer-readable storage medium stores a program that causes a network device to perform the information transmission method in any of the above first aspect and various implementations thereof.

In a twentieth aspect, a computer-readable storage medium is provided. The computer-readable storage medium stores a program that causes a network device to perform the information transmission method in any of the above second aspect and various implementations thereof.

In a twenty-first aspect, a computer-readable storage medium is provided. The computer-readable storage medium stores a program that causes a network device to perform the information transmission method in any of the above third aspect and various implementations thereof.

In a twenty-second aspect, a computer-readable storage medium is provided. The computer-readable storage medium stores a program that causes a terminal device to perform the information transmission method in any of the above-fourth aspect and various implementations thereof.

In a twenty-third aspect, a computer-readable storage medium is provided. The computer-readable storage medium stores a program that causes a terminal device to perform the information transmission method in any of the above fifth aspect and various implementations thereof.

In a twenty-fourth aspect, a computer-readable storage medium is provided. The computer-readable storage medium stores a program that causes a terminal device to perform the information transmission method in any of the above sixth aspect and various implementations thereof.

DETAILED DESCRIPTION

The technical solutions in implementations of the present disclosure are described below with reference to the accompanying drawings in the implementations of the present disclosure.

It should be understood that the technical solutions of the implementations of the present disclosure may be applied to various communication systems, for example, current communication systems, such as a Global System of Mobile Communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, and a Universal Mobile Telecommunication System (UMTS) system, and especially applied to a future 5G system or a 5G New Radio (NR) Prototype system.

It should be understood that in the implementations of the present disclosure, a network-side device may also be referred to as a network device or a base station, etc. The base station may be a Base Transceiver Station (BTS) in the GSM or CDMA, a Node B (NodeB) in the WCDMA, an Evolutional Node B (eNB or NodeB) in the LTE, or a base station device in the future 5G network, etc. The present disclosure is not limited thereto.

It should be understood that in the implementations of the present disclosure, a terminal device may communicate with one or more Core Networks via a Radio Access Network (RAN), and the terminal device may be referred to as an access terminal, User Equipment (UE), a subscriber unit, a subscriber station, a mobile station, a remote station, a remote terminal, a mobile device, a user terminal, a terminal, a wireless communication device, a user agent, or a user device. The terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, an on-board device, a wearable device, a terminal device in a future 5G network, or the like.

Figure 1:
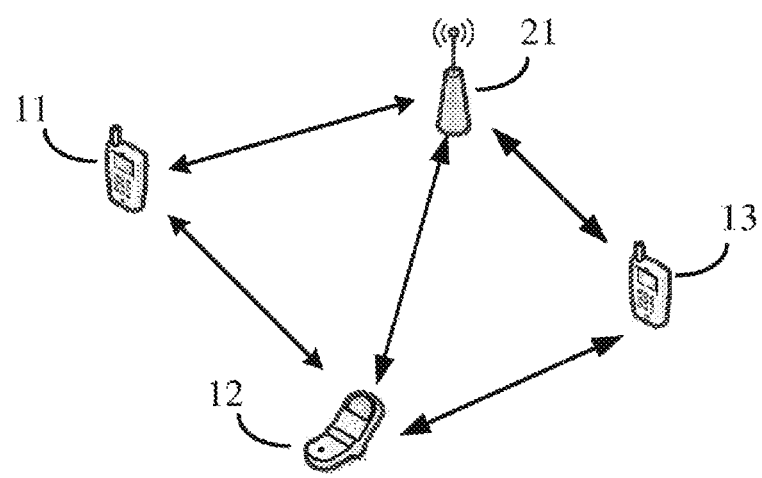
FIG. 1 is a schematic diagram of a scenario.

FIG. 1 is a schematic diagram of a scenario. It should be understood that the scenario in FIG. 1 is introduced here as an example for ease of understanding, but it does not constitute a limitation of the present disclosure. In FIG. 1, a terminal device 11, a terminal device 12, a terminal device 13 and a base station 21 are shown.

As shown in FIG. 1, the terminal device 11 may communicate with the base station 21, the terminal device 12 may communicate with the base station 21, and the terminal device 13 may communicate with the base station 21. Or, the terminal device 12 may communicate with the terminal device 11. Or, as another case, the terminal device 13 communicates with the base station 21. Here, in the communication between the terminal device and the base station or the communication between the terminal device and the terminal device, a UE-specific control channel may be indicated through a common control channel.

In the future, there will be more new service types in a future NR system or 5G system, such as, a Ultra Reliable & Low Latency Communication (URLLC) service, a Mobile Broadband (MBB) service, and a Machine Type Communication (MTC) service, etc. These new service types have different requirements on system parameters, such as a subcarrier spacing, a symbol length, a cyclic prefix length, a bandwidth configuration, etc. Therefore, multiple numerologies are introduced into the 5G system, such as coexistence of multiple subcarrier spacings (e.g., 15 kHZ, 30 kHZ, 6 kHZ . . . ).

Figure 2A:
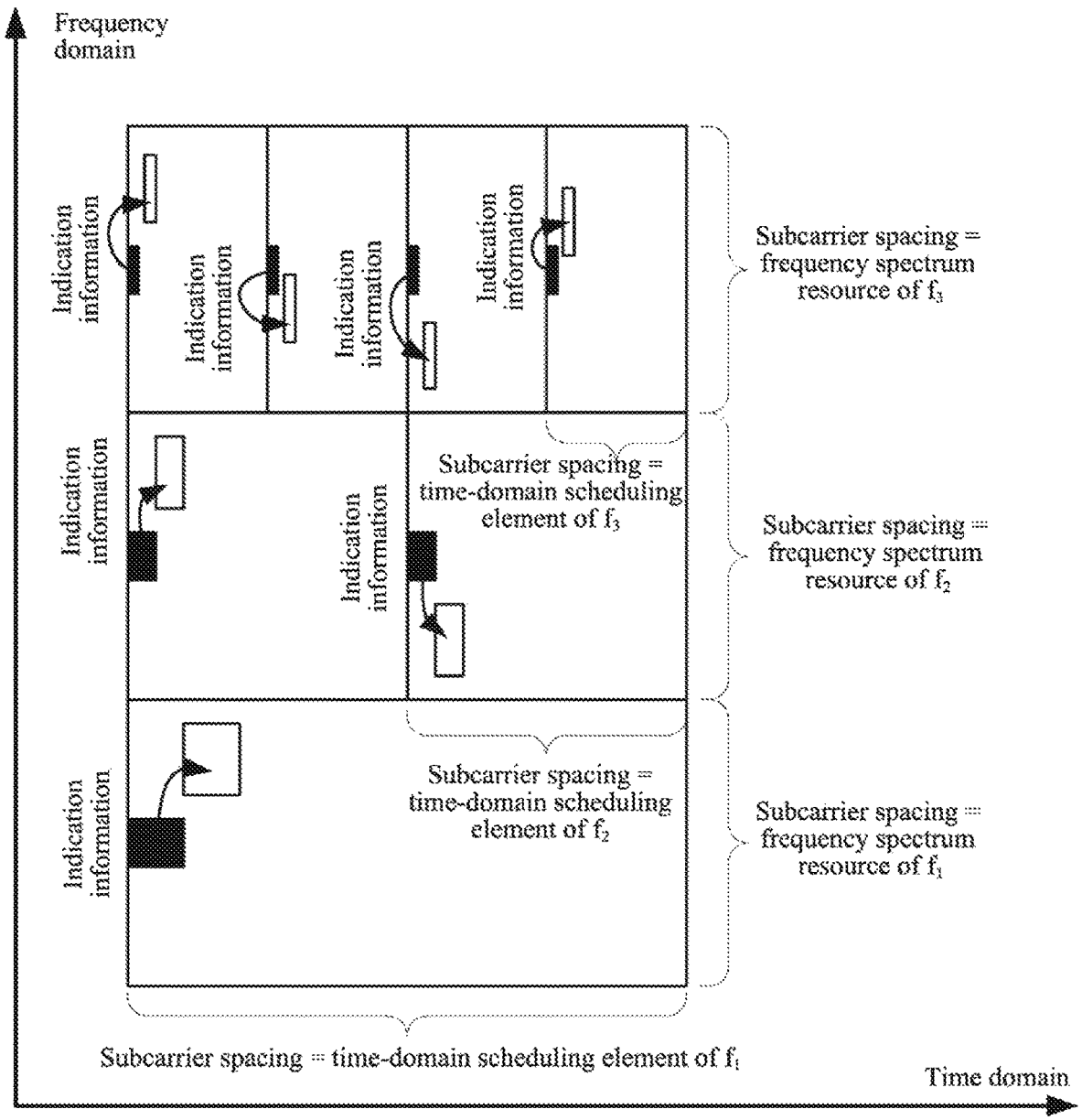
FIG. 2A is a schematic diagram of a common control channel indication solution in the existing art.

However, in the existing art, a common control channel in a resource of each numerology is used for indicating a UE-specific control channel in the resource. FIG. 2A is a schematic diagram of a common control channel indication solution in the existing art. As shown in FIG. 2A, ■ represents a common control channel for each subcarrier spacing, and ☐ represents a UE-specific control channel for each subcarrier spacing. A common control channel in a time-domain scheduling element for each subcarrier spacing (f1, f2, B in FIG. 2A) needs to indicate a UE-specific control channel in a corresponding resource. A network device needs to transmit the common control channels in time-frequency resources with different subcarrier spacings (such as f1, f2, B), which will result in channel resources waste to some extent. Moreover, since the common control channel is used to transmit important information with extremely high transmission quality requirements, the common control channel should have a very good transmission performance. However, link transmission performances of different numerologies (such as f1, f2, B) are different, which causes that the common control channels of some numerologies have poor transmission performances.

In the above solution, correspondingly, the terminal device also needs to search for the common control channels at multiple positions, so that complexity of the terminal device is increased and power consumption of the terminal device is relatively large.

Figure 2B:
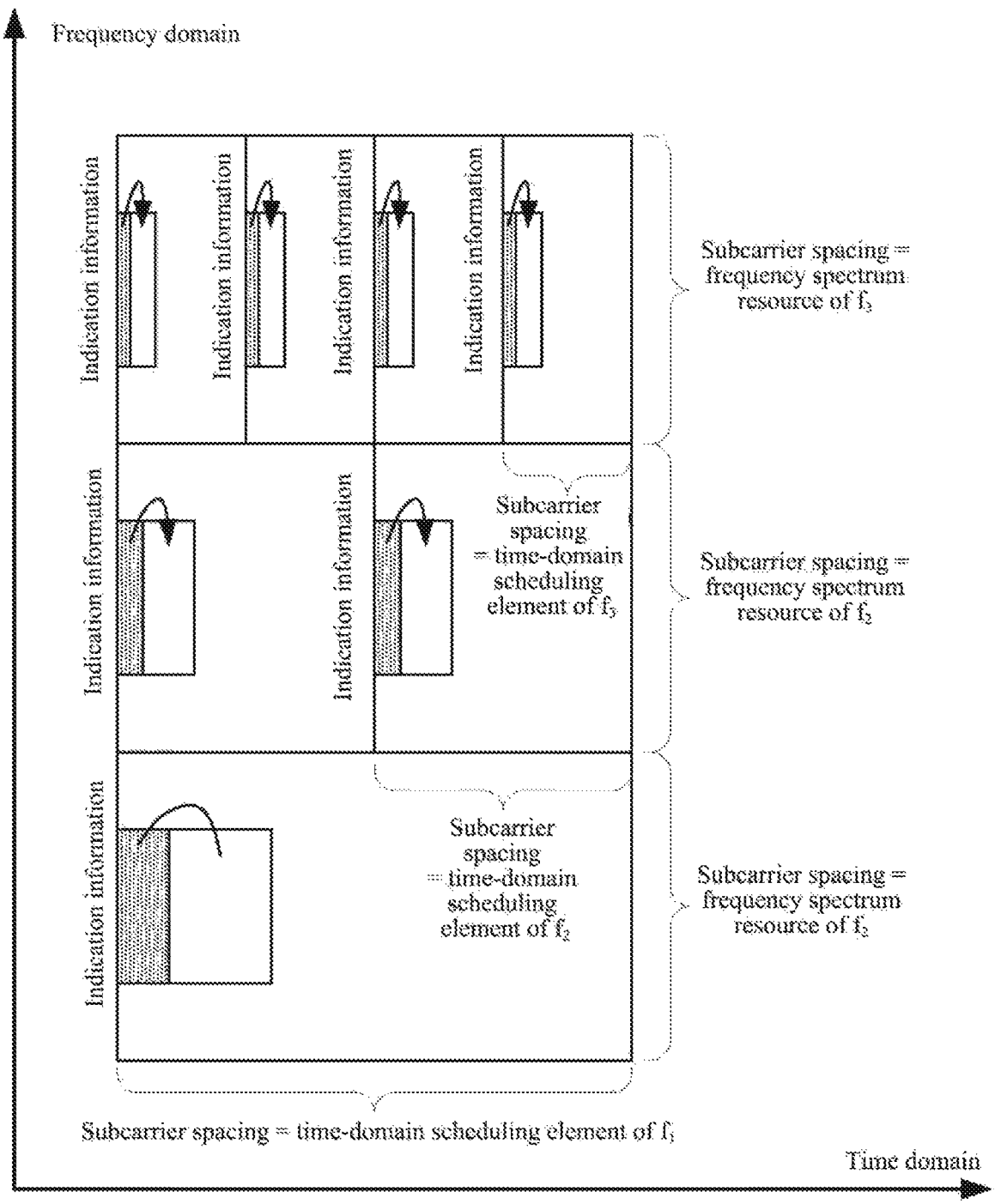
FIG. 2B is a schematic diagram of another common control channel indication solution in the existing art.

In addition, another solution is provided in the existing art. The solution is considered from the perspective of symbols, that is, control channels of other symbols are indicated through a first symbol of the control channel, without arranging control channels corresponding to different numerologies according to the different properties of the control channels. FIG. 2B shows a schematic diagram of another common control channel indication solution in the existing art. As shown in FIG. 2B, ▓ represents a control channel of a first symbol, and ☐ represents control channels of other symbols. The first symbol in the time-domain scheduling element of each subcarrier spacing (f1, f2, 3 in FIG. 2A) needs to indicate the control channels of other symbols in the corresponding resource. In this way, the network device still needs to transmit multiple control channels in the time-frequency resources with different subcarrier spacings (such as f1, f2, B), which causes the resource waste to some extent.

Therefore, the network device or terminal device of the implementations of the present disclosure attempts to indicate the control information of other multiple numerologies (such as a UE-specific control channel, etc.) through the common control channel of a numerology, to reduce the overhead of the common control channels.

Concepts or terms involved in the implementations of the present disclosure are explained below.

In the implementations of the present disclosure, the common control channel may also be referred to as a common control signalling or common search space. Correspondingly, the UE-specific control channel may also be referred to as a UE-specific control signalling or UE-specific search space. The implementations of the present disclosure are not specifically limited thereto.

In the implementations of the present disclosure, the numerology may include at least one of following parameters: a subcarrier spacing, a width of a frequency-domain scheduling element, a length of a time-domain scheduling element, a length of a cyclic prefix (CP), a number of subcarriers in a specific bandwidth, a numbers of subcarriers in a physical resource block (PRB), a length of an orthogonal frequency division multiplexing (OFDM) symbol, a number of points of Fourier transform or inverse Fourier transform used to generate an OFDM signal, a number of OFDM symbols in a transmission time interval (TTI), and a number of TTIs included in a specific time length.

The subcarrier spacing refers to a frequency spacing between adjacent subcarriers, such as 15 kHz, 60 kHz. The number of subcarriers under a specific bandwidth is, for example, a number of subcarriers corresponding to each possible system bandwidth. The number of subcarriers included in a PRB may be, for example, typically an integer multiple of 12. The number of OFDM symbols contained in a TTI may be, for example, typically an integer multiple of 14. The number of TTIs included in a specific time unit may refer to the number of TTIs included in a time length of 1 ms or 10 ms. The prefix length of a signal is, for example, the time length of the cyclic prefix of the signal, or whether the cyclic prefix is a normal CP or an extended CP.

Optionally, the numerology may be explained as: multiple frequency segments may be configured with different parameters, such as, different subcarrier bandwidths. This mode may be called a hybrid system parameter configuration mode or hybrid bandwidth mode. The English expression of this mode may be "numerology". It should be understood that multiple frequency segments may use the same parameter configuration, and the present disclosure is not limited thereto. It should also be understood that "frequency segment" may also be expressed as other names, such as "sub-band" and the like, and the specific expression is not limited by the present disclosure.

Optionally, in implementations of the present disclosure, the numerology may be understood as a reference numerology in some cases. The reference numerology means that a subcarrier spacing used by a control channel may or may not be equal to the reference numerology.

Figure 3:
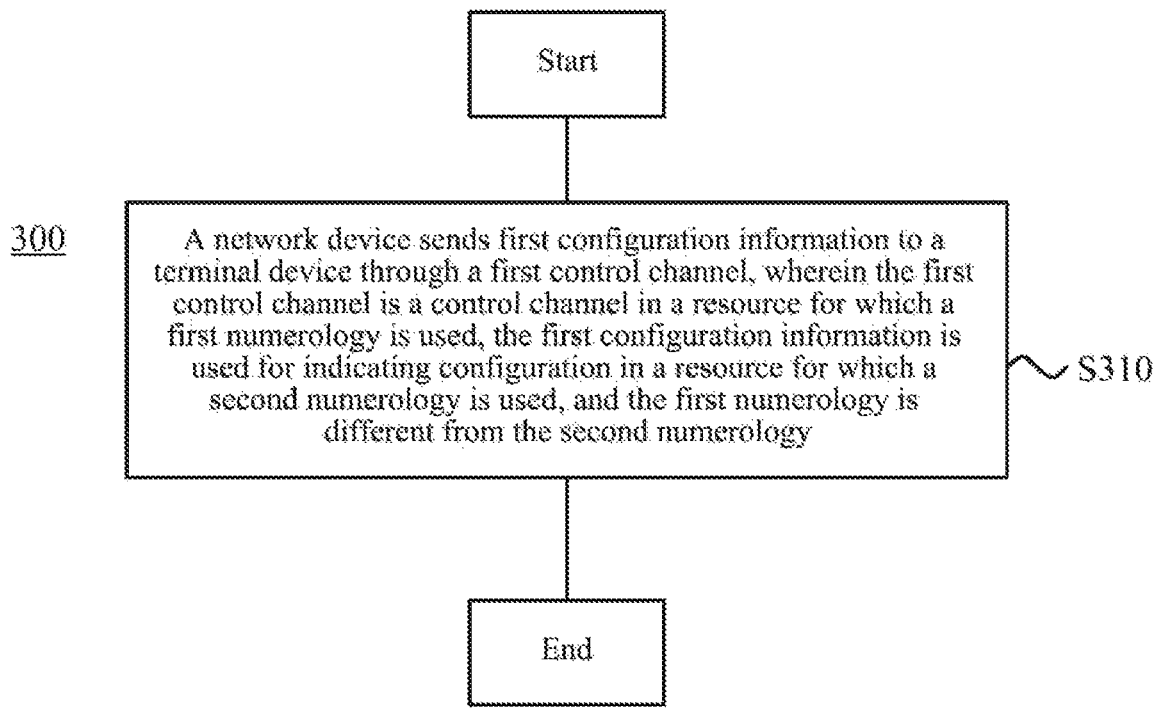
FIG. 3 is a schematic flowchart of an information transmission method according to an implementation of the present disclosure.

FIG. 3 shows a schematic flowchart of an information transmission method 300 according to an implementation of the present disclosure. The method 300 may be performed by a network device, for example, the network device may be the base station 21 in FIG. 1. As shown in FIG. 3, the method 300 includes an act S310.

In S310, a network device sends first configuration information to a terminal device through a first control channel. The first control channel is a control channel in a resource for which a first numerology is used, the first configuration information is used for indicating configuration in a resource for which a second numerology, and the first numerology is different from the second numerology.

Specifically, the network device may indicate configuration information in resources of other numerologies (such as the second numerology) by the channel (such as the first control channel) in the resource for which the first numerology is used, and send relevant configuration information (such as the first configuration information) to a terminal device. In this way, the network device does not need to send a common control channel of each numerology, thereby reducing the overhead of the common control channels. Correspondingly, the terminal device may receive the first configuration information sent by the network device through the first control channel in the resource of the first numerology to obtain the configuration information in the resources of multiple numerologies, thereby avoiding searching for the first control channel in the resources of the multiple numerologies, reducing the complexity of the terminal device, and saving the power of the terminal device.

Here, the resource of the first numerology is different from that of the second numerology.

In an implementation of the present disclosure, the first configuration information may indicate various configuration information in the resource for which the second numerology is used, for example, configuration information such as slot structure information, a reserved resource, resource pool information, etc. It should be understood that the first configuration information may include various configuration information in the resource of the second numerology, and the present disclosure is not limited thereto.

Optionally, as an implementation, the first configuration information may be configuration information of the second control channel in the resource of the second numerology. In other words, the first configuration information may indicate a relevant configuration of the second control channel in a time-frequency resource for which the second numerology is used.

It should be noted that the numerology of the first control channel may be the same as the first numerology or different from the first numerology. Similarly, the numerology of the second control channel may be the same as the second numerology or different from the second numerology.

Optionally, the first control channel may be a common control channel and the second channel may be a UE-specific control channel. That is, the network device may indicate a relevant configuration of a UE-specific control channel in a time-frequency resource of the second numerology through a common control channel in the time-frequency resource of the first numerology.

Optionally, the first configuration information may include at least one of: serial number information of a time-domain scheduling element where the second control channel is located, information of a resource used by the second control channel, and information of a numerology used by the second control channel.

Optionally, in an implementation of the present disclosure, the time-domain scheduling element may specifically be a time slot, a mini-slot, or a subframe.

Optionally, in an implementation of the present disclosure, the first control channel may use a numerology different from that used for the second control channel. That is, the numerology used for the common control channel may be different from that used for the specific control channel.

Optionally, the numerology used for the second control channel may be indicated in the information of the resource used by the second control channel, or may be indicated by the network device through other implicit forms.

Therefore, in the information transmission method according to the implementations of the present disclosure, the network device sends the first configuration information to the terminal device through the first control channel, the first control channel is a control channel in a resource for which a first numerology is used, the first configuration information is used for indicating configuration in the resource for which a second numerology is used, and the first numerology is different from the second numerology. Therefore, the overhead of the common control channel can be reduced.

Optionally, the first configuration information may include at least one of: structure information of a time-domain scheduling element in a resource of the second numerology, information of a reserved resource in the resource of the second numerology, and information of a resource pool in the resource of the second numerology.

Specifically, the network device may send the resource configuration information (such as the first configuration information) of the resource for which the second numerology is used or other information to the terminal device through the first control channel.

For example, the first configuration information may include structure information of a time-domain scheduling element in a time-frequency resource of the second numerology. The structure of the time-domain scheduling element in the resource of the second numerology may include: information such as an uplink resource portion, a downlink resource portion, or a length of a guard period (GAP).

Or, for another example, the first configuration information may include information of a reserved resource in the time-frequency resource of the second numerology.

Or, for another example, the first configuration information may include information of a resource pool in the time-frequency resource of the second numerology.

It should be understood that the above only shows some examples of the first configuration information, and there may be more combinations in specific implementations, or the first configuration information may also include other reasonable configuration information. The present disclosure is not limited thereto.

It should also be understood that the information included in the first configuration information may be sent through the same configuration information, or may be sent in different configuration information, and the present disclosure is not limited thereto.

The above describes related examples of the first configuration information. Optionally, the first control channel may carry indication information for indicating a serial number of the time-domain scheduling element corresponding to the first configuration information.

That is, when the network device sends the configuration information through the first control channel, it may further specify to which time-domain scheduling element (such as, to which subframe, slot or mini-slot) the configuration information is to be sent. In a specific implementation, the network device may indicate a time-domain scheduling element corresponding to configuration information to the terminal device by carrying a serial number of the time-domain scheduling element in the first configuration information. Or, if several mini-time slots are connected in series to form a time slot, a serial number of each mini-time slot in the time slot may be indicated, and the present disclosure is not limited thereto.

It should be understood that in the implementations of the present disclosure, only the first configuration information is taken as an example for explanation, and multiple pieces of configuration information may be introduced in practice, and the present disclosure is not limited thereto.

It should also be understood that in the implementations of the present disclosure, the serial numbers "first" and "second" . . . are only introduced to distinguish different objects, for example, to distinguish different "channels", or to distinguish different "numerologies", and does not constitute a limitation to the present disclosure.

Figure 4A:
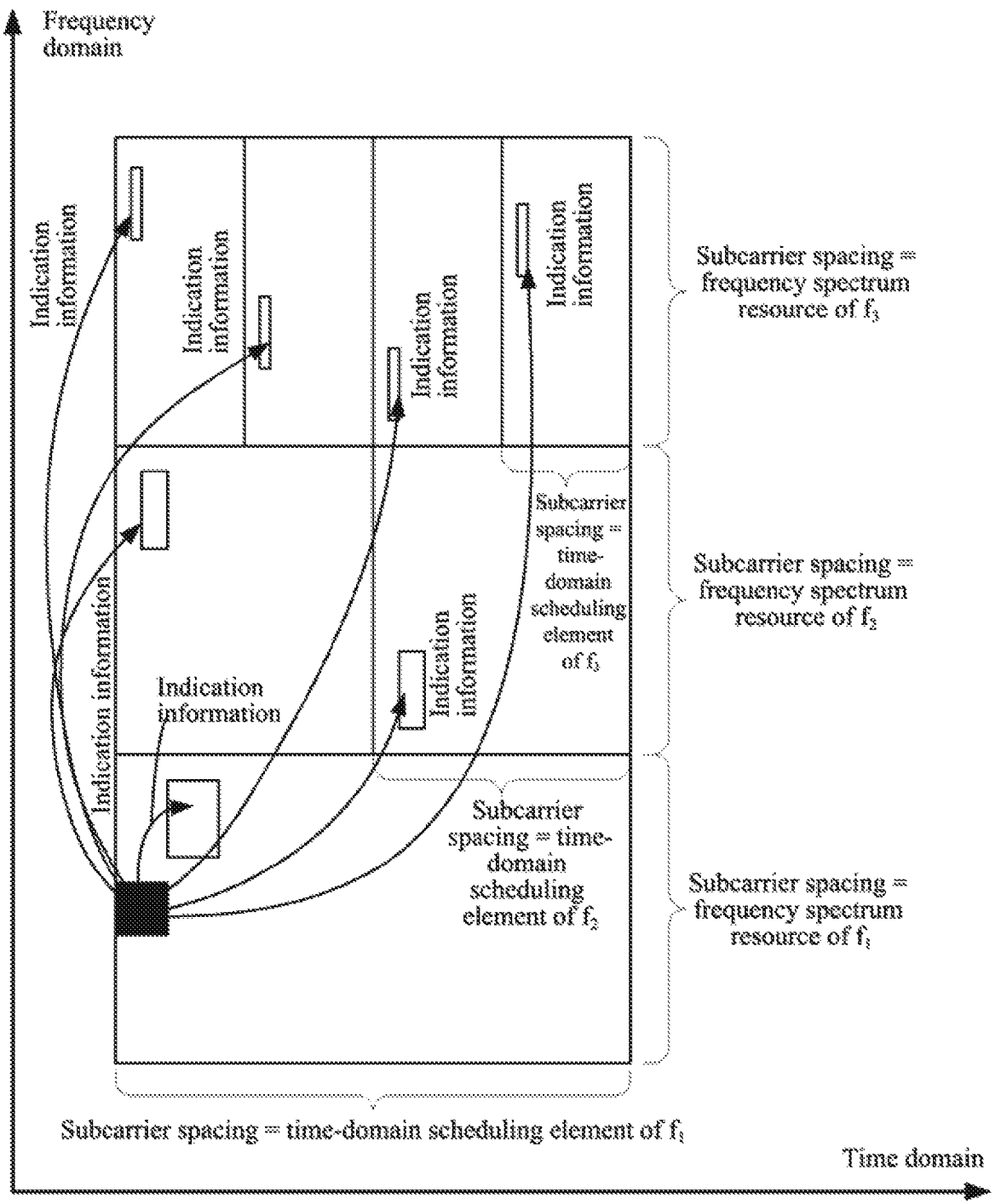
FIG. 4A is a schematic diagram of an example according to an implementation of the present disclosure.

An information transmission method according to an implementation of the present disclosure will be described below with reference to an example in FIG. 4A. As shown in FIG. 4A, ■ represents a common control channel for a subcarrier spacing f1, and □ represents a UE-specific control channel for each subcarrier spacing (subcarrier spacings f1, f2, 3 in FIG. 4A). Here, the common control channel for the subcarrier spacing f1 may be understood as the first control channel described above. The network device may indicate UE-specific control channels for other subcarrier spacings (including subcarrier spacing f2 and subcarrier spacing f3) through the common control channel for which the subcarrier spacing f1 is used. Of course, the network device may indicate the UE-specific control channel for which the subcarrier spacing f1 is used through the common control channel for which the subcarrier spacing f1 is used. Each of the multiple indication information shown in FIG. 4A may be understood as the first configuration information described above. Optionally, the network device may also indicate other configuration information (not shown in figures) in the time-domain resources of f1, f2, 3 in FIG. 4A, which is not limited.

In conclusion, compared FIG. 4A with FIGS. 2A and 2B, it can be seen that, in the information transmission method according to the implementations of the present disclosure, it does not need to send a common control channel in each time-domain scheduling element, therefore, the overhead of the common control channels can be reduced significantly. Correspondingly, the terminal device does not need to perform searching in the time-domain scheduling element of each numerology, thereby saving the power of the terminal device and reducing the complexity of the terminal device.

Figure 4B:
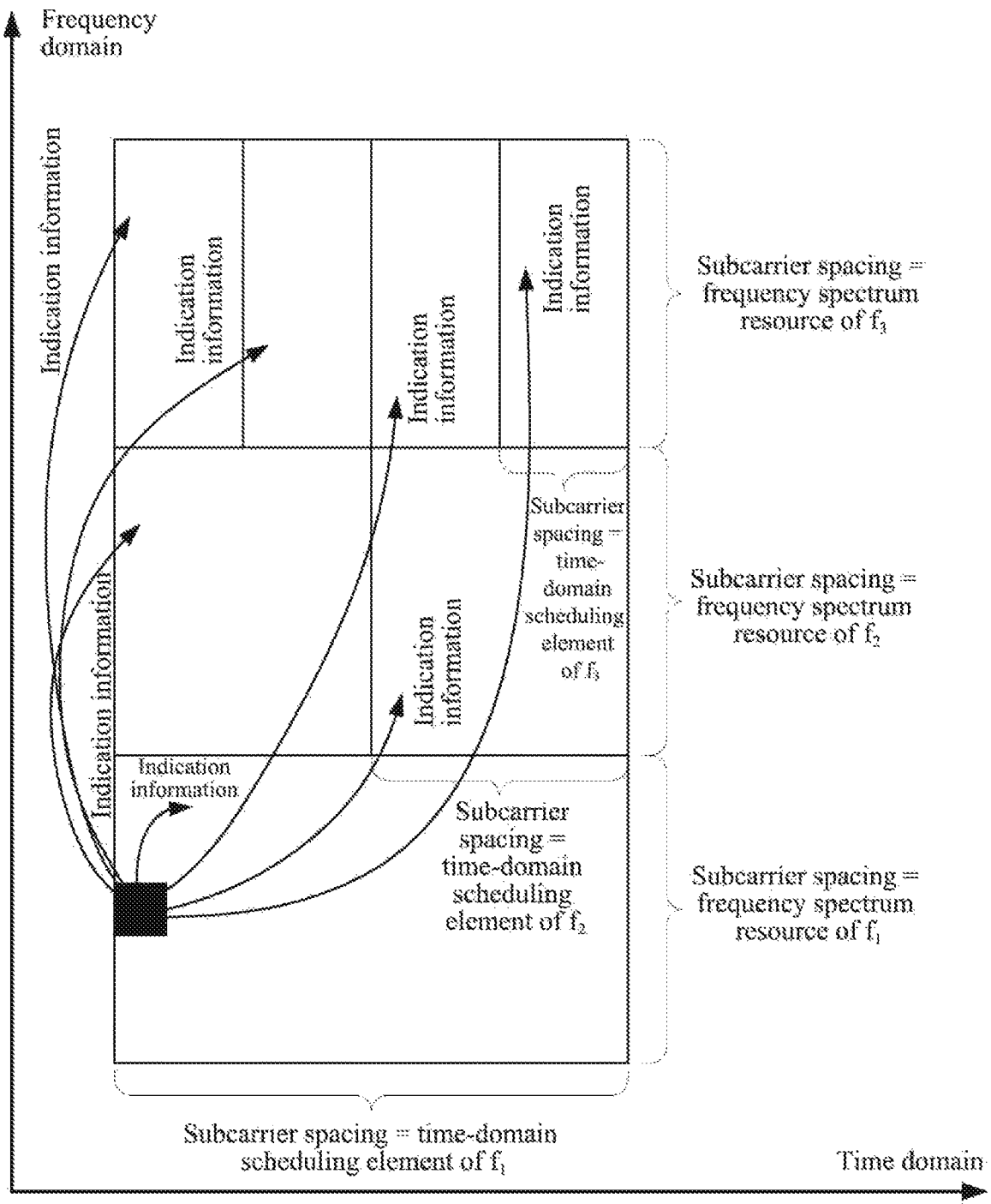
FIG. 4B is a schematic diagram of another example according to an implementation of the present disclosure.

An information transmission method according to an implementation of the present disclosure will be described below with reference to an example in FIG. 4B. For the sake of brevity, some similar concepts FIG. 4A will not be described in FIG. 4B in detail. As shown in FIG. 4B, ■ represents a common control channel for a subcarrier spacing f1. Here, the common control channel for the subcarrier spacing f1 may be understood as the first control channel described above. A network device may indicate other configuration information for other subcarrier spacings (including subcarrier spacing f2 and subcarrier spacing f3) through the common control channel for which the subcarrier spacing f1 is used. Optionally, multiple pieces of indication information in FIG. 4B may be understood as the first configuration information or other configuration information mentioned above.

It should be understood that the examples in FIGS. 4A and 4B are introduced here to only facilitate those skilled in the art to understand the technical solution of the implementations of the present disclosure, and do not constitute limitations to the present disclosure.

The information transmission method according to the implementations of the present disclosure is described above with reference to FIGS. 3, 4A and 4B, and mainly involves to the implementation at different resource divisions, wherein the resource in which the first numerology is different from the resource for which the second numerology is used. Optionally, there are also some cases, for example, an implementation, for which the first control channel and the second control channel belong to a same resource. The following will be described in detail.

Figure 5:
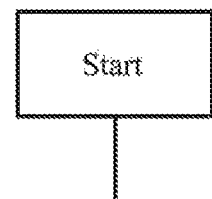
FIG. 5 is a schematic flowchart of an information transmission method according to another implementation of the present disclosure.
Figure 5:
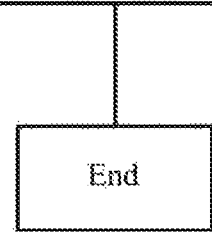

FIG. 5 shows a schematic flowchart of an information transmission method 500 according to another implementation of the present disclosure. The method 500 may be performed by a network device, for example, the network device may be the base station 21 in FIG. 1. As shown in FIG. 5, the method 500 includes an act S510.

In S510, a network device sends first configuration information to a terminal device through a first control channel. The first configuration information is used for indicating a configuration of a second control channel, and a numerology used for the first control channel is different from a numerology used for the second control channel.

Specifically, the network device may send the first configuration information to the terminal device through the first control channel, and the first configuration information is used for indicating various configurations of the second control channel. Here, different numerologies are used for the first control channel and the second control channel. Optionally, the first control channel and the second control channel may belong to a same resource. In other words, the difference from the previous implementation is that the resource corresponding to the first control channel and the resource corresponding to the second control channel may not be divided. For example, both the resource of the first control channel and the resource of the second control channel may belong to "the resource for which the first numerology is used" mentioned above, or they may both be in "the resource for which the second numerology is used" mentioned above, which is not limited.

Optionally, the first control channel is a common control channel, and the second control channel is a specific control channel of the terminal device.

Optionally, the first configuration information includes at least one of: serial number information of a time-domain scheduling element where the second control channel is located, information of a resource used for the second control channel, and information of a numerology used for the second control channel.

Optionally, the time-domain scheduling element includes a time slot, a mini-slot, or a subframe.

Optionally, the numerology includes at least one of the following parameters: a subcarrier spacing, a width of a frequency-domain scheduling element, a length of an orthogonal frequency division multiplexing (OFDM) symbol, a length of a minimum time-domain scheduling element, and a length of a cyclic prefix (CP).

Here, the concepts or terms appearing in this implementation are similar to those in the previous implementations, and will not be repeated here for the sake of brevity.

Therefore, in the information transmission method according to the implementations of the present disclosure, the network device sends first configuration information to the terminal device through the first control channel, wherein the first configuration information is used for indicating the configuration of the second control channel, and a numerology used for the first control channel is different from that used for the second control channel. In such way, the configurations of UE-specific control channels of multiple numerologies can be indicated through the common control channel of one numerology, thereby avoiding to send common control channels of the multiple numerologies, and reducing the overhead of the common control channel.

Figure 6A:
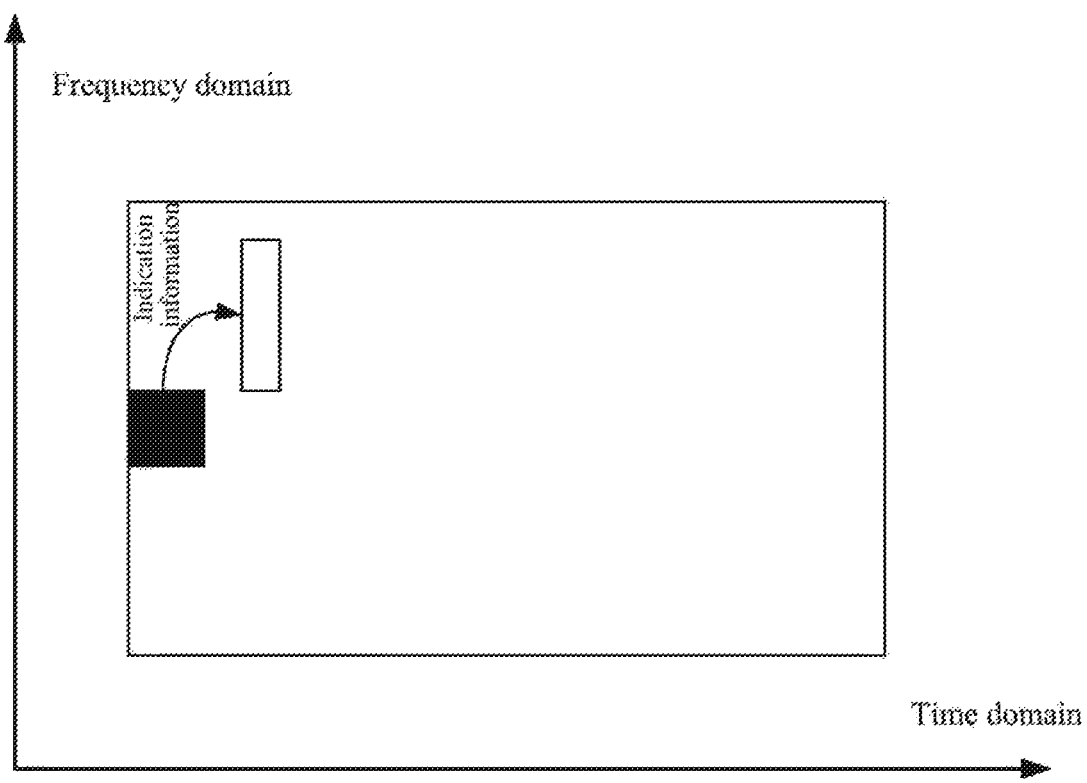
FIG. 6A is a schematic diagram of an example according to another implementation of the present disclosure.

An information transmission method according to an implementation of the present disclosure will be described below with reference to an example in FIG. 6A. As shown in FIG. 6A, ■ represents a common control channel, and ☐ represents a UE-specific control channel, and the common control channel and the UE-specific control channel may respectively use different numerologies. The common control channel and the UE-specific control channel in the figure are in a same resource. A network device may send indication information (such as the first configuration information in the implementations) to a terminal device through a common channel for configuring a UE-specific control channel.

Figure 6B:
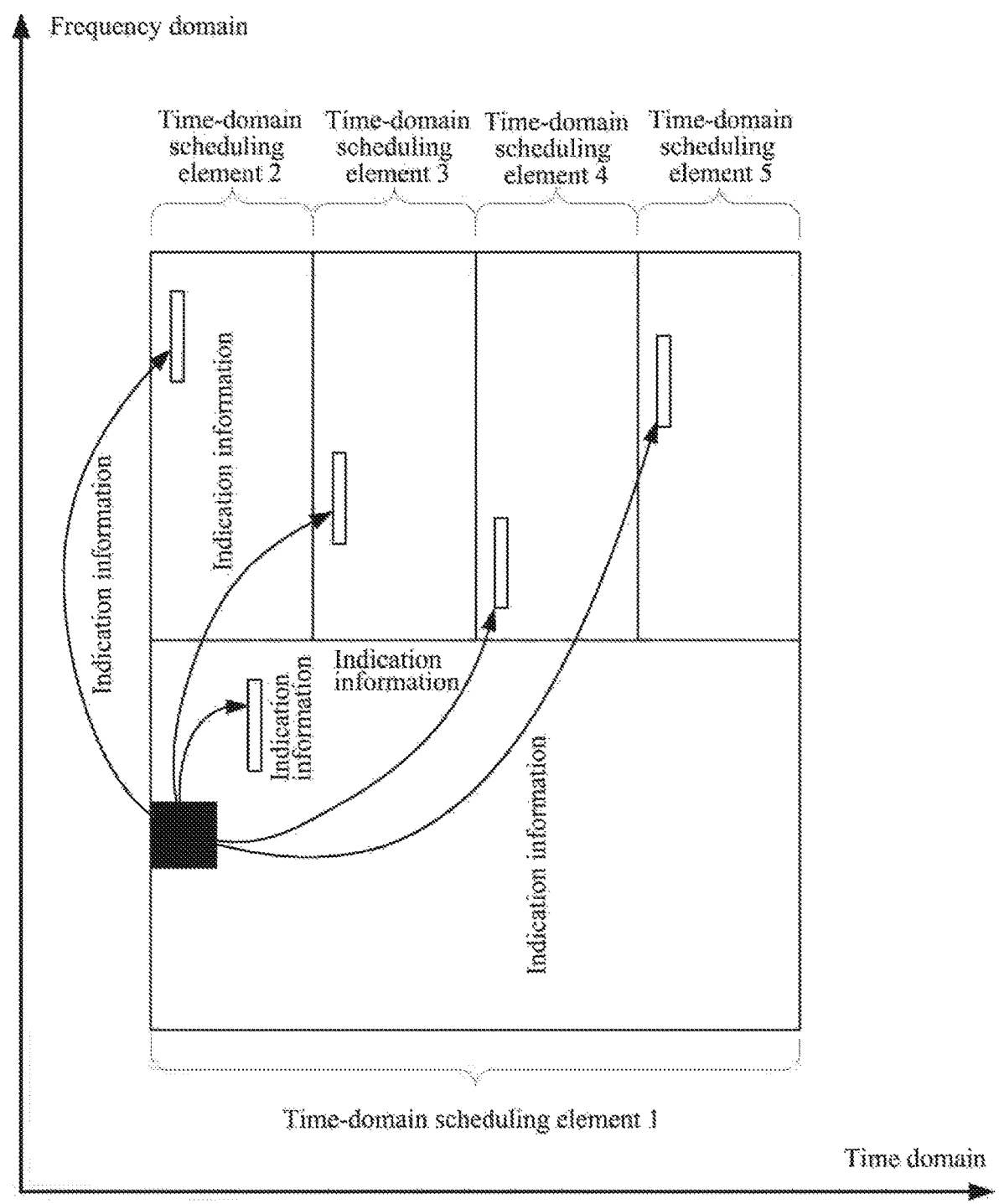
FIG. 6B is a schematic diagram of another example according to another implementation of the present disclosure.

An information transmission method according to an implementation of the present disclosure will be described below with reference to an example in FIG. 6B. As shown in FIG. 6B, ■ represents a common control channel, and ☐ represents a UE-specific control channel, and the common control channel and the UE-specific control channel may respectively use different numerologies. A common control channel is located in a time-domain scheduling element 1, and four UE-specific control channels are located in a time-domain scheduling element 2, a time-domain scheduling element 3, a time-domain scheduling element 4, and a time-domain scheduling element 5, respectively. The time-domain scheduling element 1, time-domain scheduling element 2, time-domain scheduling element 3, time-domain scheduling element 4, and time-domain scheduling element 5 may be in a same resource block. The network device may send multiple pieces of indication information (such as the first configuration information in the implementations) to the terminal device through the common channel for configuring the UE-specific control channels. Optionally, the indication information may carry a serial number of a time-domain scheduling element.

It should be understood that the examples in FIGS. 6A and 6B are introduced here to only facilitate those skilled in the art to understand the technical solutions of the implementations of the present disclosure, and do not constitute limitations to the present disclosure.

Therefore, in the information transmission method according to the implementations of the present disclosure, the network device sends the first configuration information to the terminal device through the first control channel, the first configuration information is used for indicating the configuration of the second control channel, and a numerology used for the first control channel is different from that used for the second control channel. Therefore, the overhead of the common control channel can be reduced.

Figure 7:
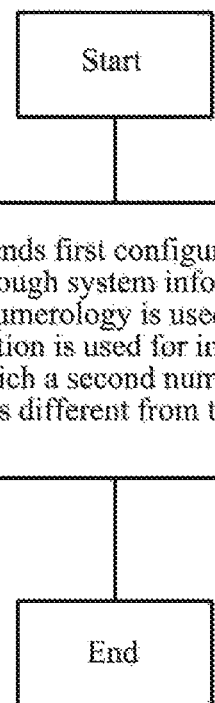
FIG. 7 is a schematic flowchart of an information transmission method according to yet another implementation of the present disclosure.

An information transmission method according to yet another implementation of the present disclosure will be described below with reference to FIG. 7. FIG. 7 shows a schematic flowchart of an information transmission method 700 according to yet another implementation of the present disclosure. The method 700 may be performed by a network device, for example, the network device may be the base station 21 in FIG. 1. As shown in FIG. 7, the method 700 includes an act S710.

In S710, a network device sends first configuration information to a terminal device through system information in a resource for which a first numerology is used. The first configuration information is used for indicating configuration of a resource for which a second numerology is used, and the first numerology is different from the second numerology.

In an implementation of the present disclosure, system information may be understood as system broadcast information.

The difference from the previous implementation is that in this implementation, the first control channel and the second control channel are not distinguished, but the relevant configuration information is sent to the terminal device through the system information. Optionally, it may be understood that the "system information" in the implementation of the present disclosure may correspond to the "first control channel" in the aforementioned method 300, and the "control channel" of the implementation of the present disclosure may correspond to the "second control channel" in the aforementioned method 300.

Specifically, the network device may send the first configuration information to the terminal device through the system information in the resource for which the first numerology is used. The first configuration information is used for indicating the configuration of the resource for which the second numerology is used, and the first numerology is different from the second numerology. In this way, the network device does not need to send the common control channel for each numerology, thereby reducing the overhead of common control channel. Correspondingly, the terminal device may receive the first configuration information sent by the network device through the system information in the resource of the first numerology to obtain the configuration information of the resources of multiple numerologies, thereby avoiding searching for the control channel in the resources of the multiple numerologies, reducing the complexity of the terminal device and saving the power of the terminal device.

Optionally, as an implementation, the first configuration information is configuration information of a control channel in a resource of the second numerology.

Optionally, as an implementation, the first configuration information includes at least one of: serial number information of a time-domain scheduling element where a control channel is located, information of a resource used for the control channel, and information of a numerology used for the control channel.

Optionally, as an implementation, the time-domain scheduling element includes a time slot, a mini-slot, or a subframe.

Optionally, as an implementation, the first configuration information may further include at least one of: structure information of a time-domain scheduling element in a resource of the second numerology, information of a reserved resource in the resource of the second numerology, and information of a resource pool in the resource of the second numerology.

Optionally, as an implementation, the system information carries indication information for indicating a serial number of a time-domain scheduling element corresponding to the first configuration information.

Optionally, as an implementation, the numerology includes at least one of following parameters: a subcarrier spacing, a width of a frequency-domain scheduling element, a length of an orthogonal frequency division multiplexing (OFDM) symbol, a length of a minimum time-domain scheduling element and a length of a cyclic prefix (CP).

Here, the concepts or terms appearing in this implementation are similar to those in the previous implementations, and will not be repeated here for the sake of brevity.

Therefore, in the information transmission method according to the implementations of the present disclosure, the network device sends the first configuration information to the terminal device through the system information in the resource for which the first numerology is used. The first configuration information is used for indicating the configuration in the resource the second numerology is used, and the first numerology is different from the second numerology, therefore the overhead of the common control channel can be reduced. Correspondingly, the terminal device may receive the first configuration information sent by the network device through the system information in the resource of the first numerology to obtain the configuration information in the resources of multiple numerologies, thereby avoiding searching for the control channel in the resources of the multiple numerologies, reducing the complexity of the terminal device and saving the power of the terminal device.

Figure 8:
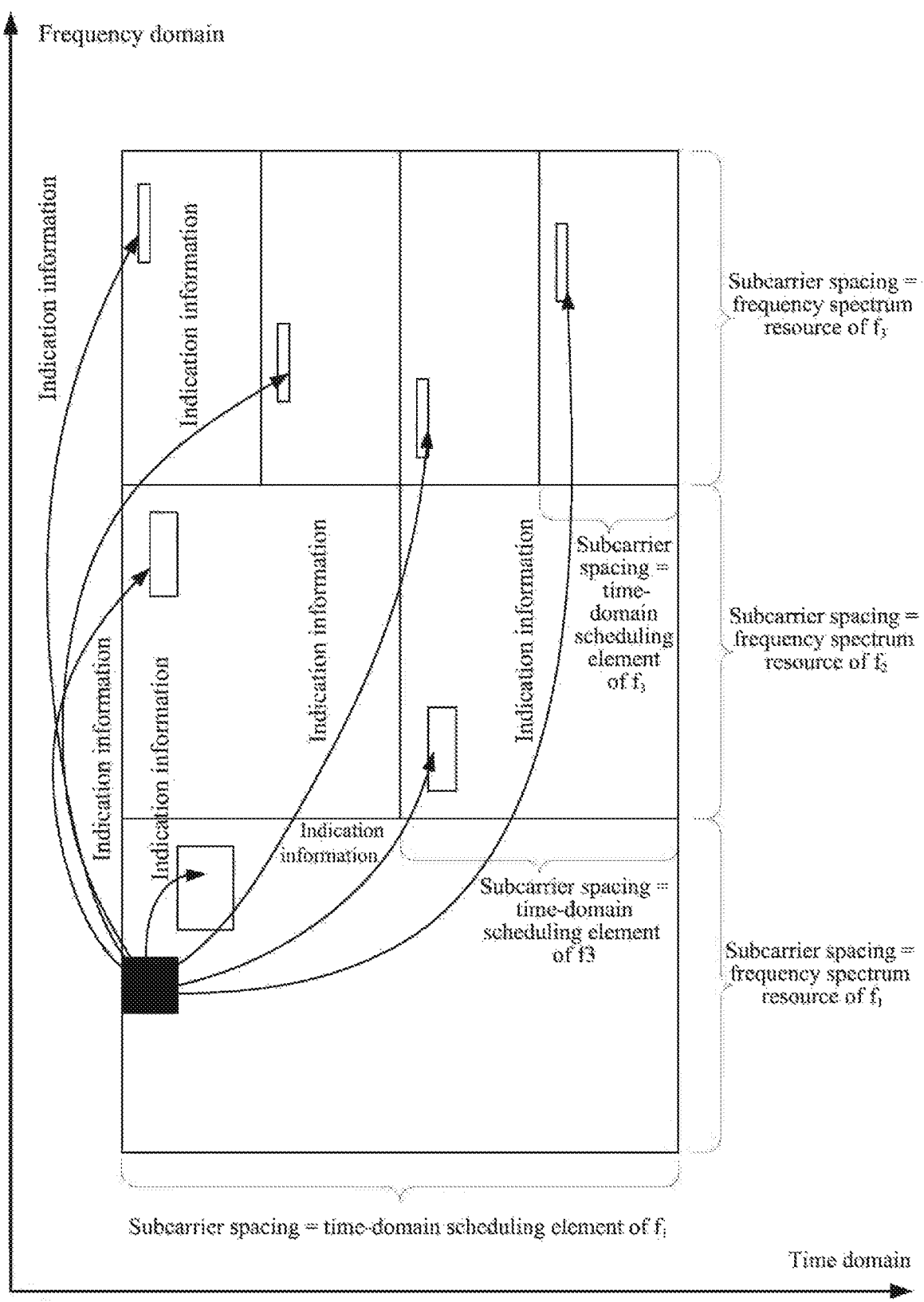
FIG. 8 is a schematic diagram of an example according to yet another implementation of the present disclosure.

An information transmission method according to an implementation of the present disclosure will be described below with reference to an example in FIG. 8. As shown in FIG. 8, ■ represents system broadcast information (located in a resource for which a subcarrier spacing f1 is used), and ☐ represents a control channel corresponding to each subcarrier spacing (including subcarrier spacings f1, f2, 3 in FIG. 8). Here, a network device may send control channels of other subcarrier spacings to a terminal device through system broadcast information. Optionally, the network device may send other configuration information (for example, the first configuration information) to the terminal device through system broadcast information, which is not limited. Similarly, the indication information in FIG. 8 may be understood as the first configuration information or other configuration information.

In this example, the network device sends the first configuration information (i.e., the indication information) to the terminal device through the system broadcast information in the resource for which the first numerology is used. The first configuration information is used for indicating the configuration in the resource for which the second numerology, and the first numerology is different from the second numerology, therefore the overhead of the common control channel can be reduced.

The method according to the implementations of the present disclosure has been previously described from the network device side. The method according to the implementations of the present disclosure will be described below from the terminal device side. For the sake of brevity, the same or similar concepts or terms as those at the network device side will not be described in detail.

Figure 9:
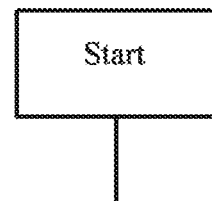
FIG. 9 is a schematic flowchart of an information transmission method according to an implementation of the present disclosure.

FIG. 9 shows a schematic flowchart of an information transmission method 900 according to an implementation of the present disclosure. The method 900 may be performed by a terminal device, for example, the terminal device may be the terminal device 11, or the terminal device 12, or the terminal device 13 in FIG. 1. The method 900 may correspond to the previous method 300. As shown in FIG. 9, the method 900 includes an act S910.

In S910, a terminal device receives first configuration information sent by a network device through a first control channel. The first control channel is a control channel in a resource for which a first numerology is used, the first configuration information is used for the network device to indicate a configuration in a resource for which a second numerology is used, and the first numerology is different from the second numerology.

In the implementations of the present disclosure, the terminal device receives the first configuration information sent by the network device through the first control channel. The first control channel is the control channel in the resource for which the first numerology is used, the first configuration information is used for the network device to indicate the configuration in the resource for which the second numerology is used, and the first numerology is different from the second numerology. Therefore, the overhead of the common control channel can be reduced, and power of the terminal device can be saved. In other words, the terminal device may receive the first configuration information sent by the network device through the first control channel in the resource of the first numerology to obtain configuration information of the resources of multiple numerologies, thereby avoiding searching for the first control channel in the resources of the multiple numerologies, reducing the complexity of the terminal device and saving the power of the terminal device.

Optionally, as an implementation, the first configuration information is configuration information of the second control channel in the resource of the second numerology.

Optionally, as an implementation, the first control channel is a common control channel, and the second control channel is a specific control channel of the terminal device.

Optionally, as an implementation, the first configuration information includes at least one of: serial number information of a time-domain scheduling element where the second control channel is located, information of a resource used for the second control channel, and information of a numerology used for the second control channel.

Optionally, as an implementation, the first configuration information includes at least one of: structure information of a minimum time-domain scheduling element in a resource of the second numerology, information of a reserved resource in the resource of the second numerology, and information of a resource pool in the resource of the second numerology.

Optionally, as an implementation, the first control channel carries indication information for indicating a serial number of a time-domain scheduling element corresponding to the first configuration information.

Optionally, as an implementation, the time-domain scheduling element includes a time slot, a mini-slot, or a subframe.

Optionally, as an implementation, a numerology used for the first control channel is different from that used for the second control channel.

Optionally, as an implementation, the numerology includes at least one of following parameters: a subcarrier spacing, a width of a minimum frequency-domain scheduling element, a length of an orthogonal frequency division multiplexing (OFDM) symbol, a length of a minimum time-domain scheduling element, and a length of a cyclic prefix (CP).

Therefore, the terminal device receives the first configuration information sent by the network device through the first control channel. The first control channel is the control channel in the resource for which the first numerology is used, the first configuration information is used for the network device to indicate the configuration in the resource for which the second numerology is used, and the first numerology is different from the second numerology. Therefore, the overhead of the common control channel can be reduced, and power of the terminal device can be saved.

Figure 10:
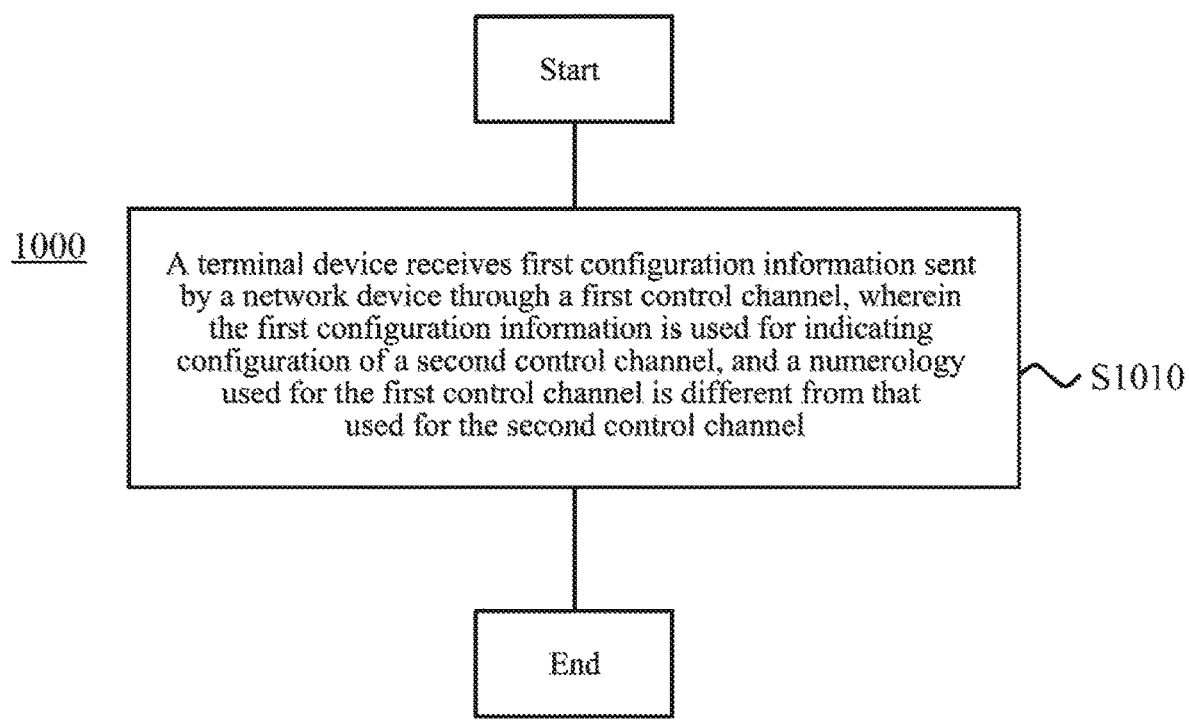
FIG. 10 is a schematic flowchart of an information transmission method according to another implementation of the present disclosure.

FIG. 10 shows a schematic flowchart of an information transmission method 1000 according to another implementation of the present disclosure. The method 1000 may be performed by a terminal device, for example, the terminal device may be the terminal device 11, or the terminal device 12, or the terminal device 13 in FIG. 1. The method 1000 may correspond to the previous method 500. As shown in FIG. 10, the method 1000 includes an act S1010.

In S1010, a terminal device receives first configuration information sent by a network device through a first control channel. The first configuration information is used for indicating a configuration of a second control channel, and a numerology used for the first control channel is different from that used for the second control channel.

Optionally, as an implementation, the first control channel is a common control channel, and the second control channel is a specific control channel of the terminal device.

Optionally, as an implementation, the first configuration information includes at least one of: serial number information of a time-domain scheduling element where the second control channel is located, information of a resource used for the second control channel, and information of a numerology used for the second control channel.

Optionally, as an implementation, the time-domain scheduling element includes a time slot, a mini-slot, or a subframe.

Optionally, as an implementation, the numerology includes at least one of following parameters: a subcarrier spacing, a width of a frequency-domain scheduling element, a length of an orthogonal frequency division multiplexing (OFDM) symbol, a length of a minimum time-domain scheduling element and a length of a cyclic prefix (CP).

Therefore, the terminal device receives the first configuration information sent by the network device through the first control channel. The first configuration information is used for indicating the configuration of the second control channel, and a numerology used for the first control channel is different from that used for the second control channel. In this way, configurations of UE-specific control channels of multiple numerologies can be indicated through the common control channel of a numerology, thereby avoiding to send common control channels of the multiple numerologies, and reducing the overhead of the common control channel, and saving the power of the terminal device.

Figure 11:
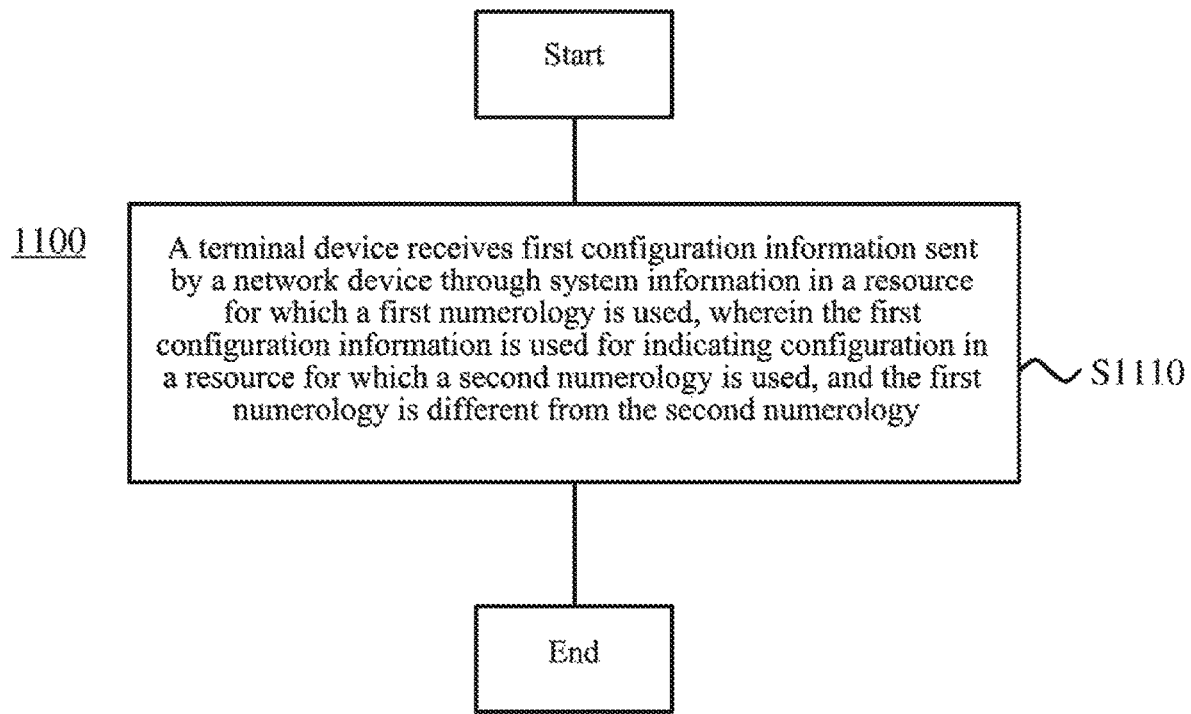
FIG. 11 is a schematic flowchart of an information transmission method according to yet another implementation of the present disclosure.

FIG. 11 shows a schematic flowchart of an information transmission method 1100 according to yet another implementation of the present disclosure. The method 1100 may be performed by a terminal device, for example, the terminal device may be the terminal device 11, or the terminal device 12, or the terminal device 13 in FIG. 1. The method 1100 may correspond to the aforementioned method 700. As shown in FIG. 11, the method 1100 includes an act S1110.

In S1110, a terminal device receives first configuration information sent by a network device through system information in a resource for which a first numerology is used, wherein the first configuration information is used for indicating configuration in a resource for which a second numerology is used, and the first numerology is different from the second numerology.

Optionally, as an implementation, the first configuration information is configuration information of a control channel in a resource of the second numerology.

Optionally, as an implementation, the first configuration information includes at least one of: serial number information of a time-domain scheduling element where the control channel is located, information of a resource used for the control channel, and information of a numerology used for the control channel.

Optionally, as an implementation, the time-domain scheduling element includes a time slot, a mini-slot, or a subframe.

Optionally, as an implementation, the method 1100 further includes: the terminal device receives first configuration information sent by the network device through the system information The first configuration information is resource allocation information in a resource for which the second numerology is used.

Optionally, as an implementation, the first configuration information includes at least one of: structure information of a time-domain scheduling element in a resource of the second numerology, information of a reserved resource in the resource of the second numerology, and information of a resource pool in the resource of the second numerology.

Optionally, as an implementation, the system information carries indication information for indicating a serial number of a time-domain scheduling element corresponding to the first configuration information.

Optionally, as an implementation, the time-domain scheduling element includes a time slot, a mini-slot, or a subframe.

Optionally, as an implementation, the numerology includes at least one of following parameters: a subcarrier spacing, a width of a frequency-domain scheduling element, a length of an orthogonal frequency division multiplexing (OFDM) symbol, a length of a minimum time-domain scheduling element and a length of a cyclic prefix (CP).

Therefore, the terminal device receives the first configuration information sent by the network device through the system information in the resource for which the first numerology is used. The first configuration information is used for indicating the configuration in the resource for which the second numerology, and the first numerology is different from the second numerology. The overhead of the common control channel can be reduced, and the power of the terminal device can be saved. In other words, the terminal device may receive the first configuration information sent by the network device through the system information in the resource of the first numerology to obtain the configuration information in the resources of multiple numerologies, thereby avoiding searching for the control channel in the resources of the multiple numerologies, reducing the complexity of the terminal device and saving the power of the terminal device.

Figure 12:
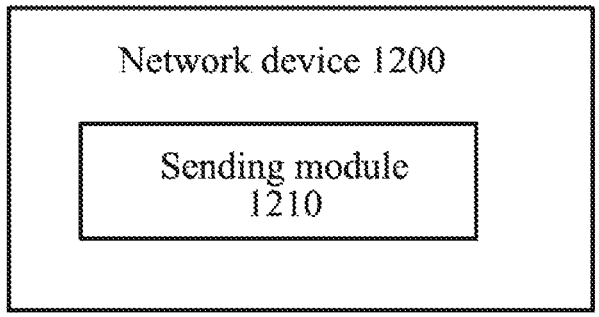
FIG. 12 is a schematic block diagram of a network device according to an implementation of the present disclosure.

A network device according to an implementation of the present disclosure will be described below. FIG. 12 shows a network device 1200 according to an implementation of the present disclosure. As shown in FIG. 12, the network device 1200 includes a sending module 1210.

The sending module 1210 is used for sending first configuration information to a terminal device through a first control channel. The first control channel is a control channel in a resource for which a first numerology is used, the first configuration information is used for indicating configuration in a resource for which a second numerology is used, and the first numerology is different from the second numerology.

Optionally, as an implementation, the first configuration information is configuration information of the second control channel in a resource of the second numerology.

Optionally, as an implementation, the first control channel is a common control channel, and the second control channel is a specific control channel of the terminal device.

Optionally, as an implementation, the first configuration information includes at least one of: serial number information of a time-domain scheduling element where the second control channel is located, information of a resource used for the second control channel, and information of a numerology used for the second control channel.

Optionally, as an implementation, the first configuration information includes at least one of: structure information of a time-domain scheduling element in a resource of the second numerology, information of a reserved resource in the resource of the second numerology, and information of a resource pool in the resource of the second numerology.

Optionally, as an implementation, the first control channel carries indication information for indicating a serial number of a time-domain scheduling element corresponding to the first configuration information.

Optionally, as one implementation, the time-domain scheduling element includes a time slot, a mini-slot, or a subframe.

Optionally, as one implementation, a numerology used for the first control channel is different from that used for the second control channel.

Optionally, as an implementation, the numerology includes at least one of following parameters: a subcarrier spacing, a width of a frequency-domain scheduling element, a length of an orthogonal frequency division multiplexing (OFDM) symbol, a length of a minimum time-domain scheduling element and a length of a cyclic prefix (CP).

The network device 1200 according to the implementations of the present disclosure may execute the information transmission method 300 according to the implementations of the present disclosure, and the above and other operations and/or functions of each module in the network device 1200 are respectively for implementing the corresponding flows of the above methods, and will not be repeated here for conciseness.

The network device 1200 according to the implementations of the present disclosure sends the first configuration information to the terminal device through the first control channel. The first control channel is the control channel in the resource for which the first numerology is used, the first configuration information is used for indicating the configuration in the resource for which the second numerology is used, and the first numerology is different from the second numerology. Therefore, the overhead of the common control channel can be reduced. Correspondingly, the terminal device may receive the first configuration information sent by the network device through the first control channel in the resource of the first numerology to obtain the configuration information in the resources of multiple numerologies, thereby avoiding searching for the first control channel in the resources of the multiple numerologies, reducing the complexity of the terminal device and saving the power of the terminal device.

Figure 13:
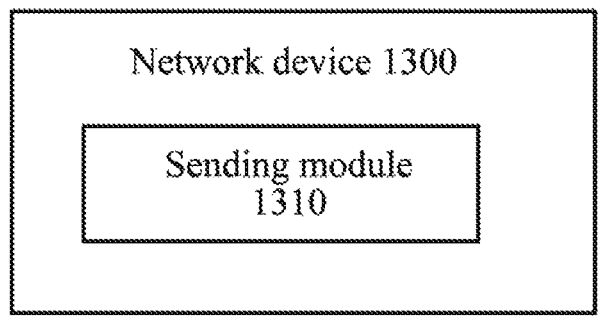
FIG. 13 is a schematic block diagram of a network device according to another implementation of the present disclosure.

FIG. 13 shows a network device 1300 according to another implementation of the present disclosure. As shown in FIG. 13, the network device 1300 includes a sending module 1310.

The sending module 1310 is used for sending first configuration information to a terminal device through a first control channel. The first configuration information is used for indicating a configuration of a second control channel, and a numerology used for the first control channel is different from that used for the second control channel.

Optionally, as an implementation, the first control channel is a common control channel, and the second control channel is a specific control channel of the terminal device.

Optionally, as an implementation, the first configuration information includes at least one of: serial number information of a time-domain scheduling element where the second control channel is located, information of a resource used for the second control channel, and information of a numerology used for the second control channel.

Optionally, as an implementation, the time-domain scheduling element includes a time slot, a mini-slot, or a subframe.

Optionally, as an implementation, the numerology includes at least one of following parameters: a subcarrier spacing, a width of a frequency-domain scheduling element, a length of an orthogonal frequency division multiplexing (OFDM) symbol, a length of a minimum time-domain scheduling element and a length of a cyclic prefix (CP).

The network device 1300 according to the implementations of the present disclosure may perform the information transmission method 500 according to the implementations of the present disclosure, and the above and other operations and/or functions of each module in the network device 1300 are respectively for implementing the corresponding flows of the above methods, and will not be repeated here for conciseness.

Therefore, the network device 1300 in the implementations of the present disclosure sends the first configuration information to the terminal device through the first control channel. The first configuration information is used for indicating the configuration of the second control channel, and a numerology used for the first control channel is different from that used for the second control channel. In such way, the configurations of UE-specific control channels of multiple numerologies can be indicated through the common control channel of a numerology, thereby avoiding to send common control channels of the multiple numerologies, and reducing the overhead of the common control channel.

Figure 14:
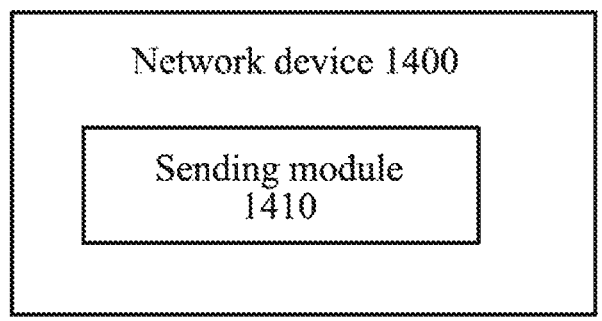
FIG. 14 is a schematic block diagram of a network device according to yet another implementation of the present disclosure.

FIG. 14 shows a network device 1400 according to still another implementation of the present disclosure. As shown in FIG. 14, the network device 1400 includes a sending module 1410.

The sending module 1410 is used for sending first configuration information to a terminal device through system information in a resource for which a first numerology is used. The first configuration information is used for indicating configuration in a resource for which a second numerology is used, and the first numerology is different from the second numerology.

Optionally, as an implementation, the first configuration information is configuration information of the control channel in a resource of the second numerology.

Optionally, as an implementation, the first configuration information includes at least one of: serial number information of a time-domain scheduling element where the control channel is located, information of a resource used for the control channel, and information of a numerology used for the control channel.

Optionally, as an implementation, the time-domain scheduling element includes a time slot, a mini-slot, or a subframe.

Optionally, as an implementation, the first configuration information includes at least one of structure information of a time-domain scheduling element in a resource of the second numerology, information of a reserved resource in the resource of the second numerology, and information of a resource pool in the resource of the second numerology.

Optionally, as an implementation, the system information carries indication information for indicating a serial number of a time-domain scheduling element corresponding to the first configuration information.

Optionally, as an implementation, the time-domain scheduling element includes a time slot, a mini-slot, or a subframe.

Optionally, as an implementation, the numerology includes at least one of following parameters: a subcarrier spacing, a width of a frequency-domain scheduling element, a length of an orthogonal frequency division multiplexing (OFDM) symbol, a length of a minimum time-domain scheduling element and a length of a cyclic prefix (CP).

The network device 1400 according to the implementations of the present disclosure may perform the information transmission method 700 according to the implementations of the present disclosure, and the above and other operations and/or functions of each module in the network device 1400 are respectively for implementing the corresponding flows of the above methods, and will not be repeated here for conciseness.

Therefore, the network device 1400 according to the implementations of the present disclosure sends the first configuration information to the terminal device through the system information in the resource for which the first numerology is used. The first configuration information is used for indicating the configuration in the resource for which the second numerology is used, and the first numerology is different from the second numerology. In this way, the overhead of the common control channel can be reduced. Correspondingly, the terminal device may receive the first configuration information sent by the network device through the system information in the resource of the first numerology to obtain the configuration information in the resources of multiple numerologies, thereby avoiding searching for the control channel in the resources of the multiple numerologies, reducing the complexity of the terminal device and saving the power of the terminal device.

Figure 15:
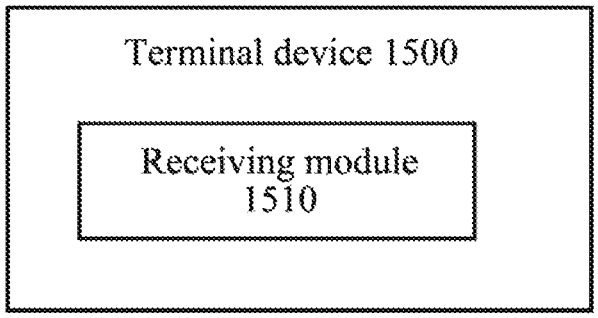
FIG. 15 is a schematic block diagram of a terminal device according to an implementation of the present disclosure.

A terminal device according to an implementation of the present disclosure will be described below. FIG. 15 shows a terminal device 1500 according to an implementation of the present disclosure. For the sake of brevity, some similar terms, definitions or concepts will not be repeated here.

As shown in FIG. 15, the terminal device 1500 includes a receiving module 1510.

The receiving module 1510 is used for receiving first configuration information sent by a network device through a first control channel. The first control channel is a control channel in a resource for which a first numerology is used, the first configuration information is used for a network device to indicate configuration in a resource for which a second numerology is used, and the first numerology is different from the second numerology.

The terminal device 1500 according to the implementations of the present disclosure may perform the information transmission method 900 according to the implementations of the present disclosure, and the above and other operations and/or functions of each module in the terminal device 1500 are respectively for implementing the corresponding flows of the above methods, and will not be repeated here for conciseness.

Therefore, the terminal device 1500 receives the first configuration information sent by the network device through the first control channel, and the first control channel is the control channel in the resource for which the first numerology is used, the first configuration information is used for the network device to indicate the configuration in the resource for which the second numerology is used, and the first numerology is different from the second numerology. In this way, the overhead of the common control channel can be reduced, and power of the terminal device can be saved. In other words, the terminal device may receive the first configuration information sent by the network device through the first control channel in the resource of the first numerology to obtain the configuration information in the resources of multiple numerologies, thereby avoiding searching for the first control channel in the resources of the multiple numerologies, reducing the complexity of the terminal device and saving the power of the terminal device.

Figure 16:
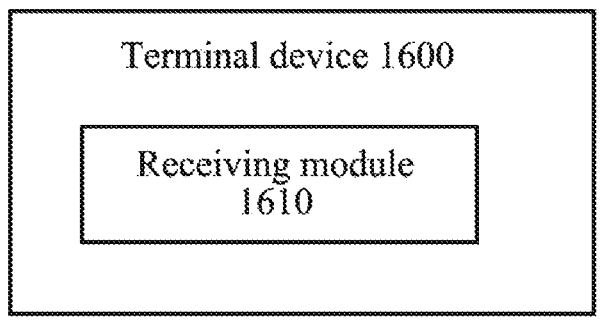
FIG. 16 is a schematic block diagram of a terminal device according to another implementation of the present disclosure.

FIG. 16 shows a terminal device 1600 according to another implementation of the present disclosure. For the sake of brevity, some similar terms, definitions or concepts will not be repeated here.

As shown in FIG. 16, the terminal device 1600 includes a receiving module 1610.

The receiving module 1610 is used for receiving first configuration information sent by network device through a first control channel. The first configuration information is used for indicating a configuration of a second control channel, and a numerology used for the first control channel is different from that used for the second control channel.

The terminal device 1600 according to the implementations of the present disclosure may perform the information transmission method 1000 according to the implementations of the present disclosure, and the above and other operations and/or functions of each module in the terminal device 1600 are respectively for implementing the corresponding flows of the above methods, and will not be repeated here for conciseness.

Therefore, the terminal device 1600 receives the first configuration information sent by the network device through the first control channel, and the first configuration information is used for indicating the configuration of the second control channel, and a numerology used for the first control channel is different from that used for the second control channel. In such way, configurations of UE-specific control channels of multiple numerologies can be indicated through the common control channel of a numerology, thereby avoiding to send common control channels of the multiple numerologies, and reducing the overhead of the common control channels, and reducing the power of the terminal device.

Figure 17:
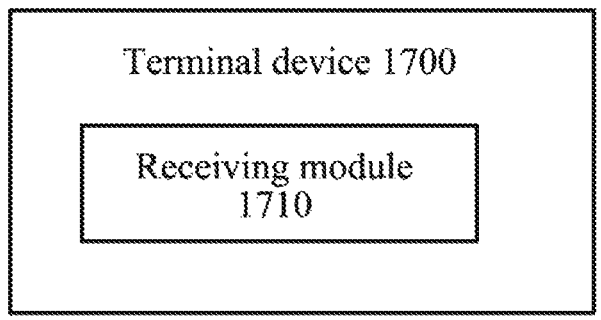
FIG. 17 is a schematic block diagram of a terminal device according to yet another implementation of the present disclosure.

FIG. 17 shows a terminal device 1700 according to yet another implementation of the present disclosure. For the sake of brevity, some similar terms, definitions or concepts will not be repeated here. As shown in FIG. 17, the terminal device 1700 includes a receiving module 1710.

The receiving module 1710 is used for receiving first configuration information sent by a network device through system information in a resource for which a first numerology is used, and the first configuration information is used for indicating configuration in a resource for which a second numerology is used, and the first numerology is different from the second numerology.

The terminal device 1700 according to the implementations of the present disclosure may perform the information transmission method 1100 according to the implementations of the present disclosure, and the above and other operations and/or functions of each module in the terminal device 1700 are respectively for implementing the corresponding flows of the above methods, and will not be repeated here for conciseness.

Therefore, the terminal device 1700 receives the first configuration information sent by the network device through system information in the resource for which the first numerology is used, and the first configuration information is used for indicating the configuration in the resource for which the second numerology is used, the first numerology is different from the second numerology. In such way, the overhead of the common control channels can be reduced, and the power of the terminal device can be saved. In other words, the terminal device may receive the first configuration information sent by the network device through the system information in the resource of the first numerology to obtain the configuration information in the resources of multiple numerologies, thereby avoiding searching for the control channels in the resources of the multiple numerologies, reducing the complexity of the terminal device and saving the power of the terminal device.

Figure 18:
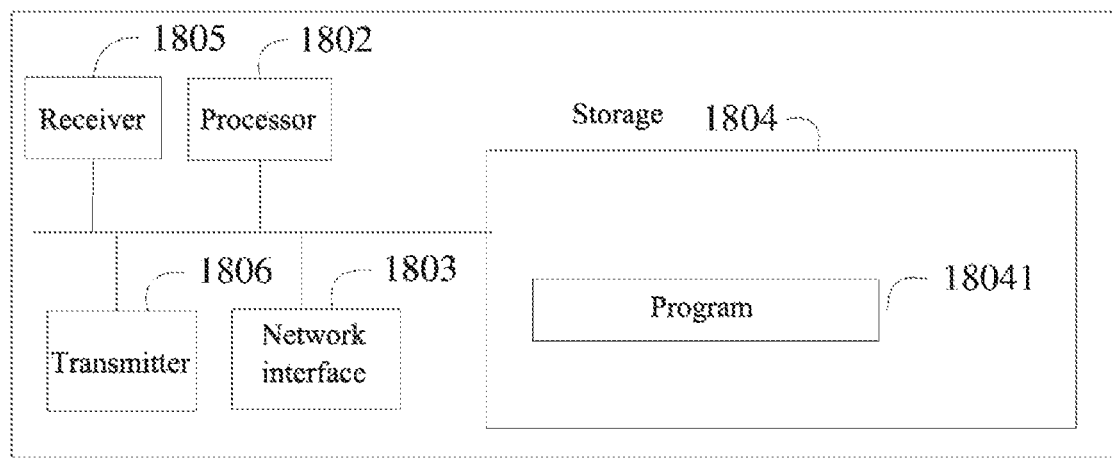
FIG. 18 is a schematic block diagram of structure of a network device according to an implementation of the present disclosure.

FIG. 18 shows structure of a network device provided by an implementation of the present disclosure, including at least one processor 1802 (e.g., CPU), at least one network interface 1803 or other communication interfaces, and a storage 1804. Optionally, the network device may further include a receiver 1805 and a transmitter 1806. The at least one processor 1802 is used for executing an executable module, such as a computer program, stored in the storage 1804. The memory 1804 may include a high-speed Random Access Memory (RAM), or a non-volatile memory, such as, at least one disk memory. Communication connection with at least one other network element is realized through at least one network interface 1803 (which may be wired or wireless). The receiver 1805 and transmitter 1806 are used for transmitting various signals or information.

In some implementations, the storage 1804 stores a program 18041 that may be executed by the processor 1802 for executing the method at the network device side in the implementations of the present disclosure described above.

In the implementation of the present disclosure, the transmitter 1806 sends first configuration information to a terminal device through a first control channel. The first control channel is a control channel in a resource for which a first numerology is used, the first configuration information is used for indicating configuration in a resource for which a second numerology is used, and the first numerology is different from the second numerology.

Figure 19:
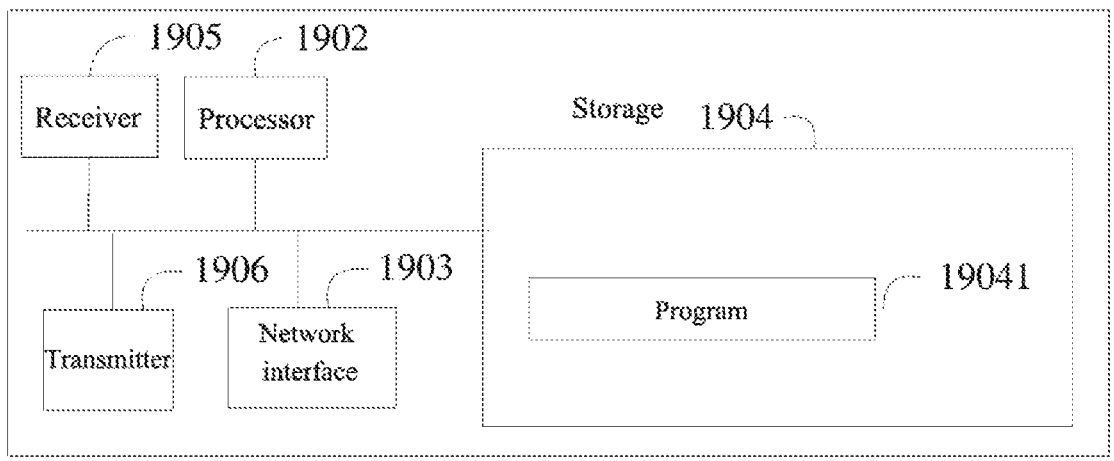
FIG. 19 is a schematic block diagram of structure of a network device according to another implementation of the present disclosure.

FIG. 19 shows structure of a network device provided by another implementation of the present disclosure, including at least one processor 1902 (e.g., CPU), at least one network interface 1903 or other communication interfaces, and a storage 1904. Optionally, the network device may further include a receiver 1905 and a transmitter 1906. The at least one processor 1902 is used for executing an executable module, such as a computer program, stored in the storage 1904. The memory 1904 may include a high-speed Random Access Memory (RAM), or a non-volatile memory, such as at least one disk memory. Communication connection with at least one other network element is realized through at least one network interface 1903 (which may be wired or wireless). The receiver 1905 and transmitter 1906 are used for transmitting various signals or information.

In some implementations, the storage 1904 stores a program 19041 that may be executed by the processor 1902 for executing the method at the network device side in the implementations of the present disclosure described above.

In the implementation of the present disclosure, the transmitter 1906 sends first configuration information to a terminal device through a first control channel. The first configuration information is used for indicating a configuration of a second control channel, and a numerology used for the first control channel is different from that used for the second control channel.

Figure 20:
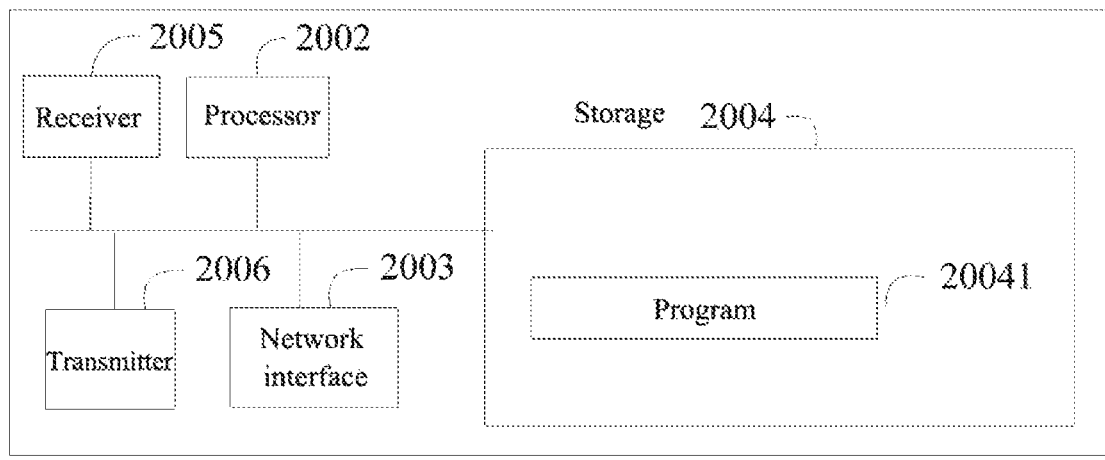
FIG. 20 is a schematic block diagram of structure of a network device according to yet another implementation of the present disclosure.

FIG. 20 shows structure of a network device provided by yet another implementation of the present disclosure, including at least one processor 2002 (e.g., CPU), at least one network interface 2003 or other communication interfaces, and a storage 2004. Optionally, the network device may further include a receiver 2005 and a transmitter 2006. The at least one processor 2002 is used for executing an executable module, such as a computer program, stored in the storage 2004. The memory 2004 may include a high-speed Random Access Memory (RAM), or a non-volatile memory, such as at least one disk memory. Communication connection with at least one other network element is realized through at least one network interface 2003 (which may be wired or wireless). The receiver 2005 and transmitter 2006 are used for transmitting various signals or information.

In some implementations, the storage 2004 stores a program 20041 that may be executed by the processor 2002 for executing the method at the network device side in the implementations of the present disclosure described above.

In the implementation of the present disclosure, the transmitter 2006 sends first configuration information to a terminal device through system information in a resource for which a first numerology is used. The first configuration information is used for indicating configuration in a resource for which a second numerology is used, and the first numerology is different from the second numerology.

Figure 21:
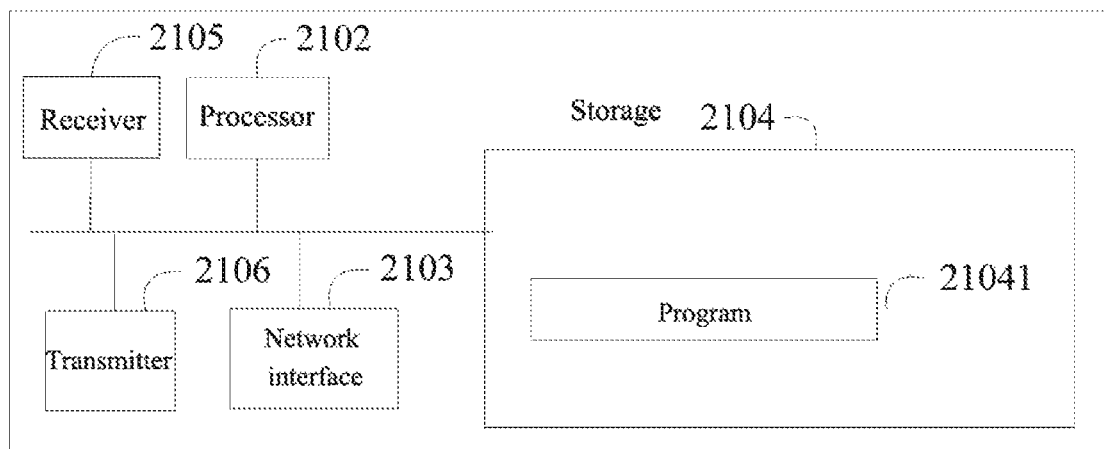
FIG. 21 is a schematic block diagram of structure of a terminal device according to an implementation of the present disclosure.

FIG. 21 shows structure of a terminal device provided by an implementation of the present disclosure, including at least one processor 2102 (e.g., CPU), at least one network interface 2103 or other communication interfaces, and a storage 2104. Optionally, the terminal device may further include a receiver 2105 and a transmitter 2106. The at least one processor 2102 is used for executing an executable module, such as a computer program, stored in the storage 2104. The memory 2104 may include a high-speed Random Access Memory (RAM), or a non-volatile memory, such as at least one disk memory. Communication connection with at least one other network element is realized through at least one network interface 2103 (which may be wired or wireless). The receiver 2105 and transmitter 2106 are used for transmitting various signals or information.

In some implementations, the storage 2104 stores a program 21041 that may be executed by the processor 2102 for executing the method at the terminal device side in the implementations of the present disclosure described above.

In the implementation of the present disclosure, the receiver 2105 receives first configuration information sent by a network device through a first control channel. The first control channel is a control channel in a resource for which a first numerology is used, the first configuration information is used for the network device to indicate configuration in a resource for which a second numerology is used, and the first numerology is different from the second numerology.

Figure 22:
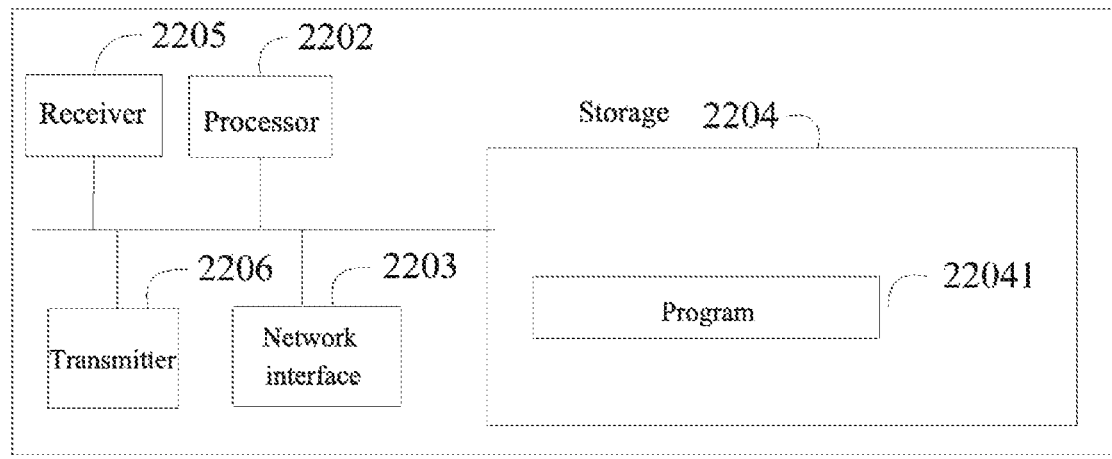
FIG. 22 is a schematic block diagram of structure of a terminal device according to another implementation of the present disclosure.

FIG. 22 shows structure of a terminal device provided by another implementation of the present disclosure, including at least one processor 2202 (e.g., CPU), at least one network interface 2203 or other communication interfaces, and a storage 2204. Optionally, the terminal device may further include a receiver 2205 and a transmitter 2206. The at least one processor 2202 is used for executing an executable module, such as a computer program, stored in the storage 2204. The storage 2204 may include a high-speed Random Access Memory (RAM), or a non-volatile memory, such as at least one disk memory. Communication connection with at least one other network element is realized through at least one network interface 2203 (which may be wired or wireless). The receiver 2205 and transmitter 2206 are used for transmitting various signals or information.

In some implementations, the storage 2204 stores a program 22041 that may be executed by the processor 2202 for executing the method at the terminal device side in the implementations of the present disclosure described above.

In the implementation of the present disclosure, the receiver 2205 receives first configuration information sent by a network device through a first control channel. The first configuration information is used for indicating a configuration of a second control channel, and a numerology used for the first control channel is different from that used for the second control channel.

Figure 23:
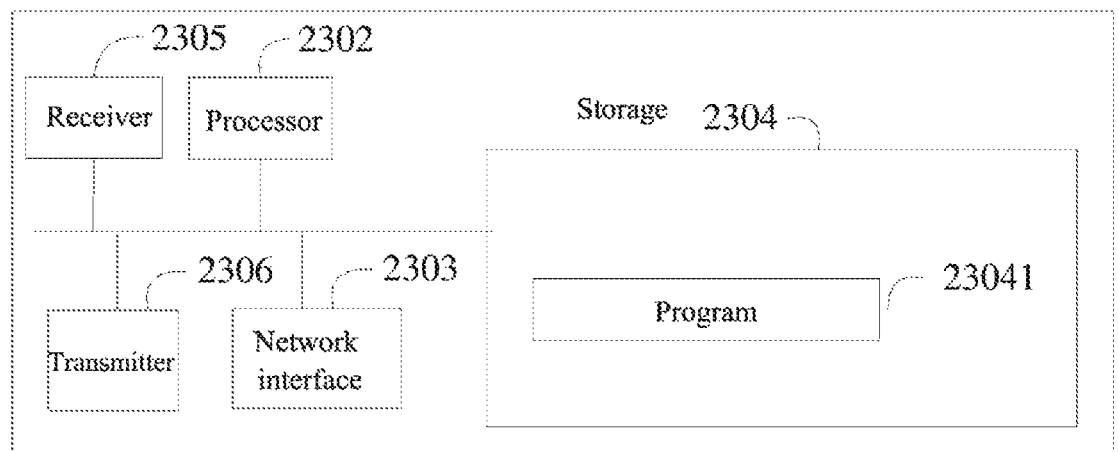
FIG. 23 is a schematic block diagram of structure of a terminal device according to yet another implementation of the present disclosure.

FIG. 23 shows structure of a terminal device provided by yet another implementation of the present disclosure, including at least one processor 2302 (e.g., CPU), at least one network interface 2303 or other communication interfaces, and a storage 2304. Optionally, the terminal device may further include a receiver 2305 and a transmitter 2306. The at least one processor 2302 is used for executing an executable module, such as a computer program, stored in the storage 2304. The storage 2304 may include a high-speed Random Access Memory (RAM), or a non-volatile memory, such as at least one disk memory. Communication connection with at least one other network element is realized through at least one network interface 2303 (which may be wired or wireless). The receiver 2305 and transmitter 2306 are used for transmitting various signals or information.

In some implementations, the storage 2304 stores a program 23041 that may be executed by the processor 2302 for executing the method at the terminal device side in the implementations of the present disclosure described above.

In the implementation of the present disclosure, the receiver 2305 receives first configuration information sent by a network device through system information in a resource for which a first numerology is used. The first configuration information is used for indicating configuration in a resource for which a second numerology is used, and the first numerology is different from the second numerology.

It should be understood that in various implementations of the present disclosure, values of sequence numbers of the above-mentioned processes do not indicate an order of execution, and the order of execution of various processes should be determined by their functions and internal logics, and should not constitute any limitation on the execution process of the implementations of the present disclosure.

Those of ordinary skill in the art will recognize that the exemplary units and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled in the art may use different methods to implement the described functions for each particular application, but such implementation should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the implementations of the present disclosure, it should be understood that the disclosed system, device and method may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The unit described as a separate unit may or may not be physically separated, and the unit shown as a unit may or may not be a physical unit, i.e., may be located in one place or may be distributed over multiple network units. Some or all of the elements can be selected according to actual needs to achieve the purpose of the implementation of the present disclosure.

In addition, various functional units in various implementations of the present disclosure may be integrated in one processing unit, or various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium includes U disk, mobile hard disk, read-only memory (ROM), random access memory (RAM), magnetic disk or optical disk, and other medium capable of storing program codes.

What are described above are merely exemplary implementations of the present disclosure, but the protection scope of the present disclosure is not limited thereto. Any person skilled in the art may easily conceive changes or substitutions in the technical scope disclosed by the present disclosure, which should be included within the protection scope of the present disclosure. Therefore, the scope of protection of the implementations of the present disclosure should be subject to the scope of protection of the claims.

What is claimed is:

1. A method for transmitting information, comprising:
    sending, by a network device, first configuration information to a terminal device through a first control channel or system information in a resource for which a first numerology is used, wherein the first configuration information is used for indicating slot structure information in a resource for which a second numerology is used, and wherein the first numerology is different from the second numerology.

2. The method according to claim 1, wherein the first configuration information comprises at least one of: structure information of a time-domain scheduling element in a resource of the second numerology, information of a reserved resource in the resource of the second numerology, and information of a resource pool in the resource of the second numerology.

3. The method according to claim 1, wherein the first control channel or the system information carries indication information for indicating a serial number of a time-domain scheduling element corresponding to the first configuration information.

4. The method according to claim 3, wherein the time-domain scheduling element comprises a time slot, a mini-slot, or a subframe.

5. The method according to claim 1, wherein the first numerology and the second numerology each comprises at least one of the following parameters:
a subcarrier spacing, a width of a frequency-domain scheduling element, a length of an orthogonal frequency division multiplexing (OFDM) symbol, a length of a minimum time-domain scheduling element, and a length of a cyclic prefix (CP).

6. The method according to claim 1, wherein the first control channel is a common control channel.

7. A method for transmitting information, comprising:
receiving, by a terminal device, first configuration information sent by a network device through a first control channel or system information in a resource for which a first numerology is used, wherein the first configuration information is used for indicating slot structure information in a resource for which a second numerology is used, and wherein the first numerology is different from the second numerology.

8. The method according to claim 7, wherein the first configuration information comprises at least one of: structure information of a time-domain scheduling element in a resource of the second numerology, information of a reserved resource in the resource of the second numerology, and information of a resource pool in the resource of the second numerology.

9. The method according to claim 7, wherein the first control channel or system information carries indication information for indicating a serial number of a time-domain scheduling element corresponding to the first configuration information.

10. The method according to claim 9, wherein the time-domain scheduling element comprises a time slot, a mini-slot, or a subframe.

11. The method according to claim 7, wherein the first numerology and the second numerology each comprises at least one of the following parameters:
a subcarrier spacing, a width of a minimum frequency-domain scheduling element, a length of an orthogonal frequency division multiplexing (OFDM) symbol, a length of a minimum time-domain scheduling element, and a length of a cyclic prefix (CP).

12. The method according to claim 7, wherein the first control channel is a common control channel.

13. A network device, comprising: a processor, a storage, and a communication interface, wherein the processor is connected with the storage and the communication interface;
the storage is used for storing instructions; and
the processor is used for executing the instructions stored in the storage to control the communication interface to perform an act of:
sending first configuration information to a terminal device through a first control channel or system information in a resource for which a first numerology is used, wherein the first configuration information is used for indicating slot structure information in a resource for which a second numerology is used, and wherein the first numerology is different from the second numerology.

14. The network device according to claim 13, wherein the first configuration information comprises at least one of: structure information of a time-domain scheduling element in a resource of the second numerology, information of a reserved resource in the resource of the second numerology, and information of a resource pool in the resource of the second numerology.

15. The network device according to claim 13, wherein the first control channel or the system information carries indication information for indicating a serial number of a time-domain scheduling element corresponding to the first configuration information.

16. The network device according to claim 15, wherein the time-domain scheduling element comprises a time slot, a mini-slot, or a subframe.

17. The network device according to claim 13, wherein the first numerology and the second numerology each comprises at least one of the following parameters:
a subcarrier spacing, a width of a frequency-domain scheduling element, a length of an orthogonal frequency division multiplexing (OFDM) symbol, a length of a minimum time-domain scheduling element, and a length of a cyclic prefix (CP).

18. The network device according to claim 13, wherein the first control channel is a common control channel.

19. A terminal device, comprising: a processor, a storage, and a communication interface, wherein the processor is connected with the storage and the communication interface;
the storage is used for storing instructions; and
the processor is used for executing the instructions stored in the storage to control the communication interface to perform an act of:
receiving first configuration information sent by a network device through a first control channel or system information in a resource for which a first numerology is used, wherein the first configuration information is used for indicating slot structure information in a resource for which a second numerology is used, and wherein the first numerology is different from the second numerology.

20. The terminal device according to claim 19, wherein the first configuration information comprises at least one of: structure information of a time-domain scheduling element in a resource of the second numerology, information of a reserved resource in the resource of the second numerology, and information of a resource pool in the resource of the second numerology.

21. The terminal device according to claim 19, wherein the first control channel or the system information carries indication information for indicating a serial number of a time-domain scheduling element corresponding to the first configuration information.

22. The terminal device according to claim 21, wherein the time-domain scheduling element comprises a time slot, a mini-slot, or a subframe.

23. The terminal device according to claim 19, wherein the first numerology and the second numerology each comprises at least one of the following parameters:
a subcarrier spacing, a width of a minimum frequency-domain scheduling element, a length of an orthogonal frequency division multiplexing (OFDM) symbol, a length of a minimum time-domain scheduling element, and a length of a cyclic prefix (CP).

24. The terminal device according to claim 19, wherein the first control channel is a common control channel.

* * * * *